United States Patent
Kim et al.

(10) Patent No.: US 10,838,765 B2
(45) Date of Patent: Nov. 17, 2020

(54) TASK EXECUTION METHOD FOR VOICE INPUT AND ELECTRONIC DEVICE SUPPORTING THE SAME

(71) Applicant: Samsung Electronics Co., Ltd., Gyeonggi-do (KR)

(72) Inventors: Jin Woong Kim, Gyeonggi-do (KR); A Ra Go, Gyeonggi-do (KR); Hyun Woo Kang, Gyeonggi-do (KR); Seong Ick Jon, Seoul (KR); Ho Jun Jaygarl, Gyeonggi-do (KR); Ga Jin Song, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 64 days.

(21) Appl. No.: 15/964,483

(22) Filed: Apr. 27, 2018

(65) Prior Publication Data
US 2018/0314552 A1    Nov. 1, 2018

(30) Foreign Application Priority Data

Apr. 28, 2017  (KR) .......................... 10-2017-0055377

(51) Int. Cl.
*G06F 9/48* (2006.01)
*G10L 15/26* (2006.01)
(Continued)

(52) U.S. Cl.
CPC ............ *G06F 9/4887* (2013.01); *G06F 3/038* (2013.01); *G06F 3/167* (2013.01); *G06F 9/485* (2013.01);
(Continued)

(58) Field of Classification Search
CPC ...... G06F 9/4887; G06F 9/485; G06F 9/5038; G10L 15/22; G10L 15/265
(Continued)

(56) References Cited

U.S. PATENT DOCUMENTS 5,542,088 A * 7/1996 Jennings, Jr. ......... G06F 9/4881
718/103
8,028,060 B1 * 9/2011 Wyld .................. H04L 43/0805
709/224
(Continued)

FOREIGN PATENT DOCUMENTS

EP     0 685 791 A2    12/1995
EP     3 010 015 A1     4/2016
(Continued)

OTHER PUBLICATIONS

European Search Report dated Sep. 10, 2018.

*Primary Examiner* — Jakieda R Jackson
(74) *Attorney, Agent, or Firm* — Cha & Reiter, LLC

(57) ABSTRACT

An electronic device includes a display, a microphone, a communication circuit, a memory configured to store at least one application, and one or more processor(s), wherein the processor is configured to obtain voice data corresponding to the user's voice received through the microphone, transmit the voice data to an external electronic device through the communication circuit, receive a sequence of tasks for performing a first function of the at least one application, which is determined based on the voice data, from the external electronic device through the communication circuit; and while performing the tasks based on the sequence of tasks, when it is determined that execution of a first task in the sequence of tasks is not completed within a specified time, extending a time-out time of the first task and switching the execution of the first task to the execution in background.

17 Claims, 19 Drawing Sheets

(51) Int. Cl.
  *G10L 15/22*    (2006.01)
  *G06F 9/50*     (2006.01)
  *G06F 3/16*     (2006.01)
  *G06F 3/038*    (2013.01)
  *G10L 15/30*    (2013.01)
  *G10L 15/18*    (2013.01)

(52) U.S. Cl.
  CPC ............ *G06F 9/5038* (2013.01); *G10L 15/22* (2013.01); *G10L 15/265* (2013.01); *G06F 2203/0381* (2013.01); *G10L 15/1822* (2013.01); *G10L 15/30* (2013.01); *G10L 2015/223* (2013.01)

(58) Field of Classification Search
  USPC .......................................................... 704/275
  See application file for complete search history.

(56) References Cited

U.S. PATENT DOCUMENTS

| | | | |
|---|---|---|---|
| 8,713,571 | B2 | 4/2014 | Banguero et al. |
| 9,170,841 | B2 | 10/2015 | Fukuzaki et al. |
| 9,678,797 | B2 | 6/2017 | Kurtzman et al. |
| 9,865,280 | B2 | 1/2018 | Sumner et al. |
| 9,959,129 | B2 | 5/2018 | Kannan et al. |
| 2011/0202924 | A1 | 8/2011 | Banguero et al. |
| 2011/0219333 | A1* | 9/2011 | Park .................. H04M 1/72583 715/808 |
| 2013/0054871 | A1* | 2/2013 | Lassa ...................... G06F 3/061 711/103 |
| 2013/0104137 | A1 | 4/2013 | Fukuzaki et al. |
| 2013/0122480 | A1* | 5/2013 | Hanrahan ................. G09B 5/02 434/322 |
| 2013/0322634 | A1* | 12/2013 | Bennett .................... G10L 21/00 381/17 |
| 2014/0278416 | A1* | 9/2014 | Schuster ................ G10L 17/00 704/246 |
| 2015/0032970 | A1* | 1/2015 | Francis ................ G06F 12/0815 711/141 |
| 2015/0254108 | A1 | 9/2015 | Kurtzman et al. |
| 2016/0104484 | A1 | 4/2016 | Chakladar et al. |
| 2016/0155443 | A1* | 6/2016 | Khan .................... G06F 1/3203 704/275 |
| 2016/0182170 | A1* | 6/2016 | Daoura ................... H04L 67/10 455/3.01 |
| 2016/0203002 | A1 | 7/2016 | Kannan et al. |
| 2016/0247110 | A1* | 8/2016 | Sinha .................. G06Q 10/109 |
| 2016/0259623 | A1 | 9/2016 | Sumner et al. |
| 2016/0260433 | A1 | 9/2016 | Sumner et al. |
| 2017/0024002 | A1* | 1/2017 | Tzafrir .................. G06F 1/3228 |
| 2017/0085706 | A1 | 3/2017 | Kim et al. |
| 2017/0236512 | A1* | 8/2017 | Williams ................ G06F 16/68 381/79 |
| 2018/0039523 | A1* | 2/2018 | Akamine ............... G06F 9/5044 |
| 2018/0108351 | A1* | 4/2018 | Beckhardt ............... G10L 15/32 |

FOREIGN PATENT DOCUMENTS

| | | |
|---|---|---|
| JP | 5653431 B2 | 1/2015 |
| KR | 10-2016-0132432 A | 11/2016 |
| KR | 10-2017-0034229 A | 3/2017 |
| WO | 2016/111881 A1 | 7/2016 |

* cited by examiner

TASK EXECUTION METHOD FOR VOICE INPUT AND ELECTRONIC DEVICE SUPPORTING THE SAME

CROSS-REFERENCE TO RELATED APPLICATION(S)

This application is based on and claims priority under 35 U.S.C. § 119 to Korean Patent Application No. 10-2017-0055377, filed on Apr. 28, 2017, in the Korean Intellectual Property Office, the disclosure of which is incorporated by reference herein its entirety.

BACKGROUND

1. Field

The present disclosure relates to a technology for voice data processing, and more particularly, to voice data processing in an artificial intelligence (AI) system utilizing a machine learning algorithm and an application thereof.

2. Description of Related Art

Electronic devices, such as smartphones, tablets, and computers are increasingly commonplace. Additionally, electronic devices include an ever-increasing number of functions and applications. With the increasing number of functions, it becomes more difficult for the user to select a desired function or application from the available applications or functions.

The above information is presented as background information only to assist with an understanding of the present disclosure. No determination has been made, and no assertion is made, as to whether any of the above might be applicable as prior art with regard to the present disclosure.

SUMMARY

An artificial intelligence system (or integrated intelligent system) can include a system that learns and judges by itself and improves a recognition rate as it is used.

An artificial intelligence technology may include a machine learning (deep learning) technologies using an algorithm that classifies or learns the characteristics of input data by themselves, and an element technology that simulate, for example, recognition, determination, and the like, by using a machine learning algorithm.

For example, the element technology may include at least one of a language understanding technology that recognizes spoken language or written character, a visual understanding technology that recognizes objects like vision, an inference or prediction technology that determines information to logically infer and predict the determined information, a knowledge expression technology that processes experience information as knowledge data, and an operation control technology that controls autonomous driving of the vehicle and the motion of the robot.

The linguistic understanding among the above-described element technologies includes natural language processing, machine translation, dialogue system, query response, speech recognition/synthesis, and the like as a technology to recognize and apply/process human language/characters.

If a specified hardware key is pressed or if a specified voice is input through a microphone, an electronic device equipped with an artificial intelligence system may launch an intelligence app such as a speech recognition app (or application) and may enter a standby state for receiving a user's voice input through the intelligence app. For example, the electronic device may display the user interface (UI) of the intelligence app on the screen of a display. In addition, the electronic device may receive the user's voice input through the microphone in the standby state. In this case, the electronic device may transmit voice data corresponding to the received voice input to an intelligence server. The intelligence server may convert the received voice data to text data and may determine a sequence of tasks including information about tasks (or operations) to perform the function of at least one application included in the electronic device or information about a parameter required to perform the tasks, based on the converted text data. Afterwards, the electronic device may receive the sequence of tasks from the intelligence server and may perform the tasks depending on the sequence of tasks.

In the case where a task, which requires a long execution time, from among tasks to be performed continuously is present, an electronic device that receives the sequence of tasks from an intelligence server to process the sequence of tasks, may wait for the execution completion of the corresponding task or may cancel the processing for the pass rule by the time-out set to the task.

Aspects of the present disclosure may address at least the above-mentioned problems and/or disadvantages and may provide at least the advantages described below. Accordingly, an aspect of the present disclosure is to provide a voice data processing method that increases the time-out time of the delayed task and switches the delayed task to the task in background in the case where the delayed task is present while tasks are performed depending on the sequence of tasks received from the intelligence server, and an electronic device supporting the same. In accordance with an aspect of the present disclosure, an electronic device includes a display, a microphone configured to receive a voice input, a communication circuit configured to communicate with an external electronic device, a memory configured to store at least one application; and one or more processor(s) electrically connected to the microphone, the communication circuit, the display, and the memory, wherein the processor is configured to obtain voice data corresponding to the user's voice received through the microphone, transmit the voice data to the external electronic device through the communication circuit, receive a sequence of tasks for performing a first function of the at least one application, which is determined based on the voice data, from the external electronic device through the communication circuit; and while performing the tasks based on the sequence of tasks, when it is determined that execution of a first task in the sequence of tasks is not completed within a specified time, extending a time-out time of the first task and switching the execution of the first task to the execution in background.

In accordance with another aspect of the present disclosure, a voice data processing method of an electronic device, the method comprises obtaining voice data corresponding to voice input received through a microphone; transmitting the voice data to an external electronic device through a communication circuit; receiving via the communication circuit, a sequence of tasks for performing a first function of at least one application, determined based on the voice data, from the external electronic device; and while performing the tasks based on the sequence of tasks, when it is determined that execution of a first task is not completed within a specified time, extending a time-out time of the first task and switching the execution of the first task to the execution in background.

In accordance with another aspect of the present disclosure, an electronic device comprising: a housing; a touch screen display disposed inside the housing and exposed through a first portion of the housing; a microphone disposed inside the housing and exposed through a second portion of the housing; at least one speaker disposed inside the housing and exposed through a third portion of the housing; a wireless communication circuit disposed inside the housing; one or more processor(s) disposed inside the housing and electrically connected to the touch screen display, the microphone, the speaker, and the wireless communication circuit; and a memory disposed inside the housing and electrically connected to the processor, wherein the memory stores a first application including a first user interface, and wherein the memory stores instructions that, when executed, cause the processor to: receive a user input including a request for performing a task by using the first application, through at least one of the touch screen display or the microphone; transmit data associated with the user input to an external server through the wireless communication circuit; receive a response including information about sequence of states of the electronic device for performing the task, from the external server via the wireless communication circuit, wherein the electronic device is in the sequence of states to perform the task such that each of the states is completed within a specified time; and when one selected state associated with the first application lasts longer than the specified time, extend the specified time for the selected state.

According to various embodiments of the present disclosure, the time-out time of the delayed task may increase, and thus, it is possible to prevent the processing on the pass rule from being canceled.

According to various embodiments of the present disclosure, the delayed task may be switched to the task in background, thereby increasing the usability of the electronic device by providing a method of performing another function that another task or an electronic device supports.

Besides, a variety of effects directly or indirectly understood through this disclosure may be provided.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Hereinafter, various embodiments of the present disclosure may be described to be associated with accompanying drawings. Accordingly, those of ordinary skill in the art will recognize that modification, equivalent, and/or alternative on the various embodiments described herein can be variously made without departing from the scope and spirit of the present disclosure.

Before describing an embodiment of the present disclosure, an integrated intelligent system to which an embodiment of the present disclosure is applied will be described.

Figure 1:
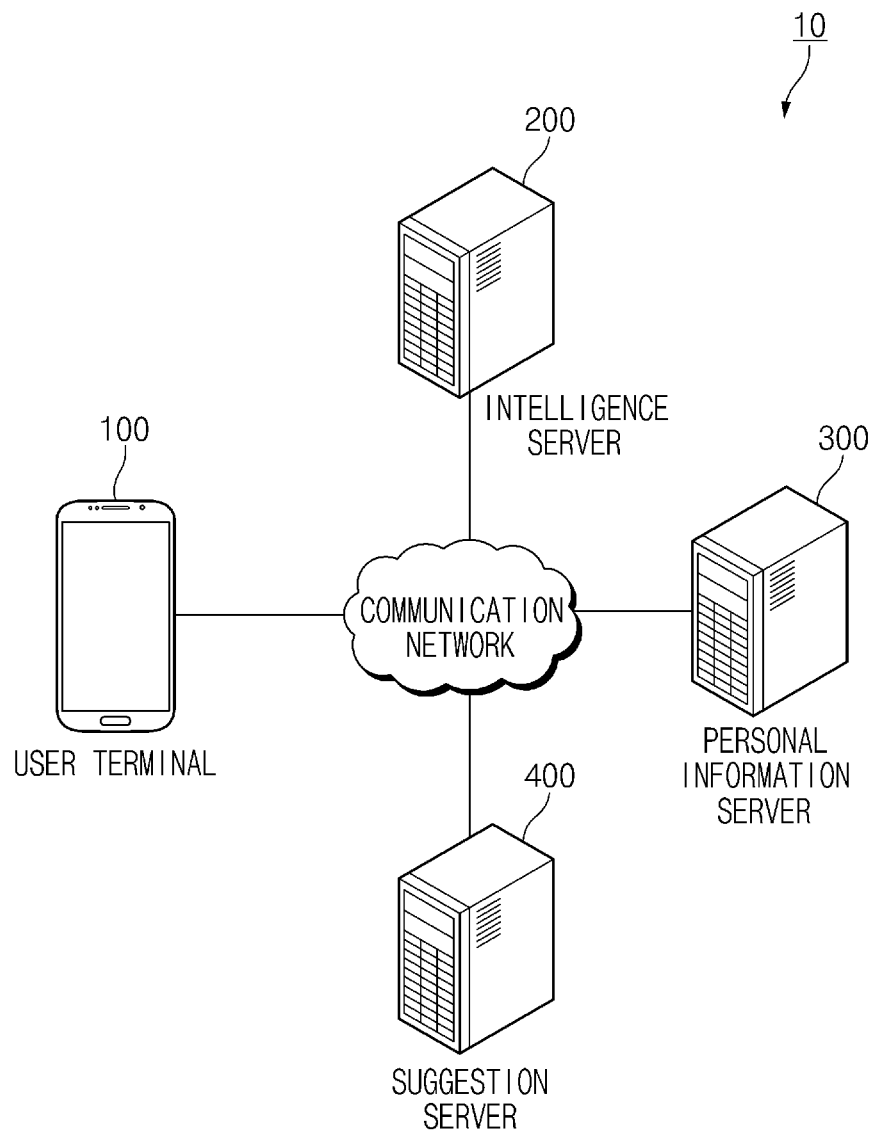
FIG. 1 is a view illustrating an integrated intelligent system, according to various embodiments of the present disclosure.

FIG. 1 is a view illustrating an integrated intelligent system, according to various embodiments of the present disclosure.

Referring to FIG. 1, an integrated intelligent system 10 may include a user terminal 100, an intelligence server 200, a personal information server 300, or a suggestion server 400.

The user terminal 100 may provide a service necessary for a user through an app (or an application program) (e.g., an alarm app, a message app, a picture (gallery) app, or the like) stored in the user terminal 100. For example, the user terminal 100 may execute and operate another app through an intelligence app (or a speech recognition app) stored in the user terminal 100. A user input for launching and operating the other app through the intelligence app of the user terminal 100 may be received. For example, the user input may be received through a physical button, a touch pad, a voice input, a remote input, or the like. According to an embodiment, various types of terminal devices (or an electronic device), which are connected with Internet, such as a mobile phone, a smartphone, personal digital assistant (PDA), a notebook computer, and the like may correspond to the user terminal 100.

According to an embodiment, the user terminal 100 may receive user utterance as a user input. The user terminal 100 may receive the user utterance and may generate an instruction for operating an app based on the user utterance. As such, the user terminal 100 may operate the app by using the instruction.

The intelligence server 200 may receive a voice input of a user from the user terminal 100 over a communication network and may change the voice input to text data. In another embodiment, the intelligence server 200 may generate (or select) a sequence of tasks based on the text data. The sequence of tasks may include information about a task (or an operation, function, or an action) for performing the function of an app or information about a parameter necessary to perform the task. In addition, the sequence of tasks may include the order of the task of the app. The user terminal 100 may receive the sequence of tasks, may select an app depending on the sequence of tasks, and may execute a task included in the sequence of tasks in the selected app.

For example, the user terminal 100 may execute the task and may display a screen corresponding to a state of the user terminal 100, which executes the task, in a display. For another example, the user terminal 100 may execute the task and may not display the result obtained by executing the task in the display. For example, the user terminal 100 may execute a plurality of tasks and may display only the result of a part of the plurality of tasks in the display. For example, the user terminal 100 may display only the result, which is obtained by executing the last task, in the display. For another example, the user terminal 100 may receive the user input to display the result obtained by executing the task in the display.

The personal information server 300 may include a database in which user information is stored. For example, the personal information server 300 may receive the user information (e.g., context information, information about execution of an app, or the like) from the user terminal 100 and may store the user information in the database. The intelligence server 200 may be used to receive the user information from the personal information server 300 over the communication network and to generate a sequence of tasks associated with the user input. According to an embodiment, the user terminal 100 may receive the user information from the personal information server 300 over the communication network, and may use the user information as information for managing the database.

The suggestion server 400 may include a database storing information about a function in a terminal, introduction of an application, or a function to be provided. For example, the suggestion server 400 may include a database associated with a function that a user utilizes by receiving the user information of the user terminal 100 from the personal information server 300. The user terminal 100 may receive information about the function to be provided from the suggestion server 400 over the communication network and may provide the information to the user.

Figure 2:
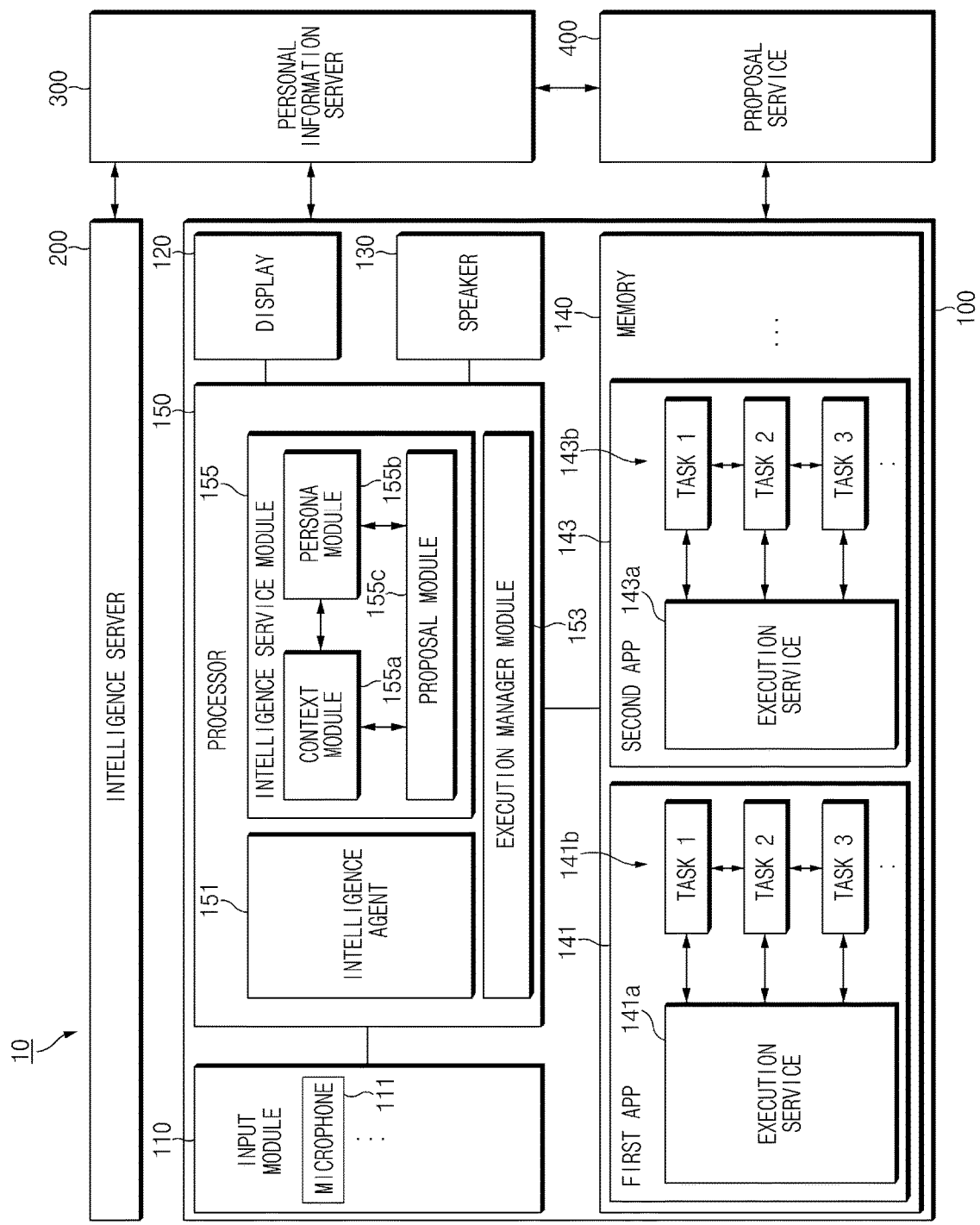
FIG. 2 is a block diagram illustrating a user terminal of an integrated intelligent system, according to an embodiment of the present disclosure.

FIG. 2 is a block diagram illustrating a user terminal of an integrated intelligent system, according to an embodiment of the present disclosure.

Referring to FIG. 2, the user terminal 100 may include an input module 110, a display 120, a speaker 130, a memory 140, or a processor 150. The user terminal 100 may further include a housing, and elements of the user terminal 100 may be seated in the housing or may be positioned on the housing.

According to an embodiment, the input module 110 may receive a user input from a user. For example, the input module 110 may receive the user input from the connected external device (e.g., a keyboard or a headset). For another example, the input module 110 may include a touch screen (e.g., a touch screen display) coupled to the display 120. For another example, the input module 110 may include a hardware key (or a physical key) placed in the user terminal 100 (or the housing of the user terminal 100).

According to an embodiment, the input module 110 may include a microphone (e.g., a microphone 111 of FIG. 3) that is capable of receiving user utterance as a voice input. For example, the input module 110 may include a speech input system and may receive the utterance of the user as a voice input through the speech input system.

According to an embodiment, the display 120 may display an image, a video, and/or an execution screen of an application. For example, the display 120 may display a graphic user interface (GUI) of an app.

According to an embodiment, the speaker 130 may output the voice signal. For example, the speaker 130 may output the voice signal generated in the user terminal 100 to the outside.

According to an embodiment, the memory 140 may store a plurality of apps 141 and 143. The plurality of apps 141 and 143 stored in the memory 140 may be selected, launched, and executed depending on the user input.

According to an embodiment, the memory 140 may include a database capable of storing information necessary to recognize the user input. For example, the memory 140 may include a log database capable of storing log information. For another example, the memory 140 may include a personal database capable of storing information particular to a user.

According to an embodiment, the memory 140 may store the plurality of apps 141 and 143, and the plurality of apps 141 and 143 may be loaded to operate. For example, the plurality of apps 141 and 143 stored in the memory 140 may be loaded by an execution manager module 153 of the processor 150 to operate. The plurality of apps 141 and 143 may include execution services 141a and 143a performing a function or a plurality of tasks (or unit tasks) 141b and 143b. The execution services 141a and 143a may be generated by the execution manager module 153 of the processor 150 and then may execute the plurality of tasks 141b and 143b.

According to an embodiment, when the tasks 141b and 143b of the apps 141 and 143 are executed, an execution state screen according to the execution of the tasks 141b and 143b may be displayed in the display 120. For example, the execution state screen may be a screen in a state where the tasks 141b and 143b are completed. For another example, the execution state screen may be a screen where tasks 141b and 143b are in a scanning state (e.g., waiting for a necessary parameter or input).

According to an embodiment, the execution services 141a and 143a may execute the tasks 141b and 143b depending on a sequence of tasks. For example, the execution services 141a and 143a may be activated by the execution manager module 153, may receive an execution request from the execution manager module 153 depending on the sequence of tasks, and may execute the tasks 141b and 143b of the apps 141 and 143 depending on the execution request. If the execution of the tasks 141b and 143b is completed, the execution services 141a and 143a may transmit completion information to the execution manager module 153.

According to an embodiment, in the case where the plurality of the tasks 141b and 143b are respectively executed in the apps 141 and 143, the plurality of the tasks 141b and 143b may be sequentially executed. For example, task 143b may be data dependent on task 141b. If the execution of one task (task 1) is completed, the execution services 141a and 143a may open the next task (task 2) and may transmit completion information to the execution manager module 153. Here, it is understood that opening an arbitrary task is to change a state of the arbitrary task to an executable state or to prepare the execution of the arbitrary task. In other words, if the arbitrary task is not opened, the corresponding task may be not executed. If the completion information is received, the execution manager module 153 may transmit an execution request for the next tasks 141b and 143b to an execution service (e.g., task 2). According to an embodiment, in the case where the plurality of apps 141 and 143 are executed, the plurality of apps 141 and 143 may be sequentially executed. For example, if receiving the completion information after the execution of the last task of the first app 141 is executed, the execution manager module 153 may transmit the execution request of the first task of the second app 143 to the execution service 143a.

According to an embodiment, in the case where the plurality of the tasks 141b and 143b are executed in the apps 141 and 143, a result screen according to the execution of each of the executed plurality of the tasks 141b and 143b may be displayed in the display 120. According to an embodiment, only a part of a plurality of result screens according to the executed plurality of the tasks 141b and 143b may be displayed in the display 120.

According to an embodiment, the memory 140 may store an intelligence app (e.g., a speech recognition app) operating in conjunction with an intelligence agent 151. The app operating in conjunction with the intelligence agent 151 may receive and process the utterance of the user as a voice signal. According to an embodiment, the app operating in conjunction with the intelligence agent 151 may be triggered by a specific input (e.g., an input through a hardware key, an input through a touch screen, or a specific voice input) input through the input module 110.

According to an embodiment, the processor 150 may control overall tasks of the user terminal 100. For example, the processor 150 may control the input module 110 to receive the user input. The processor 150 may control the display 120 to display an image. The processor 150 may control the speaker 130 to output the voice signal. The processor 150 may control the memory 140 to read or store necessary information.

According to an embodiment, the processor 150 may be electrically connected to the input module 110, including the microphone receiving the voice input, and may include the intelligence agent 151, the execution manager module 153, or an intelligence service module 155. In an embodiment, the processor 150 may drive the intelligence agent 151, the execution manager module 153, or the intelligence service module 155 by executing instructions stored in the memory 140. Modules described in various embodiments of the present disclosure may be implemented by hardware or by software. In various embodiments of the present disclosure, it is understood that the task executed by the intelligence agent 151, the execution manager module 153, or the intelligence service module 155 is an task executed by the processor 150.

According to an embodiment, the intelligence agent 151 may generate an instruction for operating an app based on the voice signal received as the user input. According to an embodiment, the execution manager module 153 may receive the generated instruction from the intelligence agent 151, and may select, launch, and operate the apps 141 and 143 stored in the memory 140. According to an embodiment, the intelligence service module 155 may manage information of the user and may use the information of the user to process the user input.

The intelligence agent 151 may transmit and process the user input received through the input module 110 to the intelligence server 200 through a communication circuit.

According to an embodiment, before transmitting the user input to the intelligence server 200, the intelligence agent 151 may pre-process the user input. According to an embodiment, to pre-process the user input, the intelligence agent 151 may include an adaptive echo canceller (AEC) module, a noise suppression (NS) module, an end-point detection (EPD) module, or an automatic gain control (AGC) module. The AEC may remove an echo included in the user input. The NS module may suppress a background noise included in the user input. The EPD module may detect an end-point of a user voice included in the user input to search for a part in which the user voice is present. The AGC module may adjust the volume of the user input so as to be suitable to recognize and process the user input. According to an embodiment, the intelligence agent 151 may include all the pre-processing elements for performance. However, in another embodiment, the intelligence agent 151 may include a part of the pre-processing elements to operate at low power.

According to an embodiment, the intelligence agent 151 may include a wake up recognition module recognizing a call of a user. The wake up recognition module may recognize a wake up instruction of the user through the speech recognition module. In the case where the wake up recognition module receives the wake up instruction, the wake up recognition module may activate the intelligence agent 151 to receive the user input. According to an embodiment, the wake up recognition module of the intelligence agent 151 may be implemented with a low-power processor (e.g., a processor included in an audio codec). According to an embodiment, the intelligence agent 151 may be activated depending on the user input entered through a hardware key. In the case where the intelligence agent 151 is activated, an intelligence app (e.g., a speech recognition app) operating in conjunction with the intelligence agent 151 may be executed. In certain embodiments, the wake up agent 151 can be woken in response to receiving a predetermined voice input. For example, a user utterance of a predetermined word(s) can cause the wake up agent 151 to wake up.

According to an embodiment, the intelligence agent 151 may include a speech recognition module for performing the user input. The speech recognition module may recognize the user input for executing a task in an app. For example, the speech recognition module may recognize a limited user (voice) input (e.g., utterance such as "click" for executing a capturing task when a camera app is being executed) for executing a task such as the wake up instruction in the apps 141 and 143. For example, the speech recognition module for recognizing a user input while assisting the intelligence server 200 may recognize and rapidly process a user instruction capable of being processed in the user terminal 100. According to an embodiment, the speech recognition module for executing the user input of the intelligence agent 151 may be implemented in an app processor.

According to an embodiment, the speech recognition module (including the speech recognition module of a wake up module) of the intelligence agent 151 may recognize the user input by using an algorithm for recognizing a voice. For example, the algorithm for recognizing the voice may be at least one of a hidden Markov model (HMM) algorithm, an artificial neural network (ANN) algorithm, or a dynamic time warping (DTW) algorithm.

According to an embodiment, the intelligence agent 151 may change the voice input of the user to text data. According to an embodiment, the intelligence agent 151 may transmit the voice of the user to the intelligence server 200. Additionally, the intelligence agent 151 may display the text data in the display 120.

According to an embodiment, the intelligence agent 151 may receive a sequence of tasks from the intelligence server 200. According to an embodiment, the intelligence agent 151 may transmit the sequence of tasks to the execution manager module 153.

According to an embodiment, the intelligence agent 151 may transmit the execution result log according to the sequence of tasks (received from the intelligence server 200) to the intelligence service module 155, and the transmitted execution result log may be accumulated and managed in preference information of the user of a persona module 155b.

According to an embodiment, the execution manager module 153 may receive the sequence of tasks from the intelligence agent 151 to execute the apps 141 and 143 and may allow the apps 141 and 143 to execute the tasks 141b and 143b included in the sequence of tasks. For example, the execution manager module 153 may transmit instruction information for executing the tasks 141b and 143b to the apps 141 and 143, respectively, and may receive completion information of the tasks 141b and 143b from the apps 141 and 143.

According to an embodiment, the execution manager module 153 may transmit or receive the instruction information for executing the tasks 141b and 143b of the apps 141 and 143 between the intelligence agent 151 and the apps 141 and 143. The execution manager module 153 may bind the apps 141 and 143 to be executed depending on the sequence of tasks and may transmit the instruction information of the tasks 141b and 143b included in the sequence of tasks to the apps 141 and 143. For example, the execution manager module 153 may sequentially transmit the tasks 141b and 143b included in the sequence of tasks to the apps 141 and 143 and may sequentially execute the tasks 141b and 143b of the apps 141 and 143 depending on the sequence of tasks.

According to an embodiment, the execution manager module 153 may manage execution states of the tasks 141b and 143b of the apps 141 and 143. For example, the execution manager module 153 may receive information about the execution states of the tasks 141b and 143b from the apps 141 and 143. For example, in the case where the tasks 141b and 143b are in a scanning state (e.g., waiting for a parameter of input, necessary for the task), the execution manager module 153 may transmit information about the scan state to the intelligence agent 151. The intelligence agent 151 may make a request for an input of necessary information (e.g., parameter information) to the user by using the received information. For another example, in the case where the execution state of the tasks 141b and 143b are in an operating state, processor 150 may cause a speaker output a voice prompt, asking the user for an additional utterance/voice input. The utterance/voice input may be received from the user, and the execution manager module 153 may transmit information about the apps 141 and 143 being executed and the execution states of the apps 141 and 143 to the intelligence agent 151. The intelligence agent 151 may receive parameter information from the voice input of the user through the intelligence server 200 and may transmit the received parameter information to the execution manager module 153. The execution manager module 153 may change a parameter of each of the tasks 141b and 143b to a new parameter by using the received parameter information.

According to an embodiment, the execution manager module 153 may transmit the parameter information included in the sequence of tasks to the apps 141 and 143. In the case where the plurality of apps 141 and 143 are sequentially executed depending on the sequence of tasks, the execution manager module 153 may transmit the parameter information included in the sequence of tasks from one app to another app.

According to an embodiment, the execution manager module 153 may receive a plurality of sequence of tasks. The execution manager module 153 may select a plurality of sequence of tasks based on the utterance/voice input of the user. For example, in the case where the user utterance specifies the app 141 executing a part of the task 141b but does not specify the app 143 executing any other task 143b, the execution manager module 153 may receive a plurality of different sequence of tasks in which the same app 141 (e.g., an gallery app) executing the part of the task 141b is executed and in which different apps 143 (e.g., a message app or a Telegram app) executing the other task 143b. For example, the execution manager module 153 may execute the same tasks 141b and 143b (e.g., the same successive tasks 141b and 143b) of the plurality of sequences of tasks. In the case where the execution manager module 153 executes the same task, the execution manager module 153 may display a state screen for selecting the different apps 141 and 143 included in the plurality of sequences of tasks in the display 120.

According to certain embodiments, while performing the tasks based on the sequence of tasks, when it is determined that a first task is not executed within a specified time, the processor 150 extends a time-out time of the first task and switch the execution of the first task to the execution in background.

A time-out time shall be understood to refer to a time limit for a task that is being executed and waiting for an event, such as an input or parameter to detect the event.

According to an embodiment, the intelligence service module 155 may include a context module 155a, a persona module 155b, or a proposal module 155c.

The context module 155a may collect current states of the apps 141 and 143 from the apps 141 and 143. For example, the context module 155a may receive context information indicating the current states of the apps 141 and 143 to collect the current states of the apps 141 and 143.

The persona module 155b may manage personal information of the user utilizing the user terminal 100. For example, the persona module 155b may collect the usage information and the execution result of the user terminal 100 to manage personal information of the user.

The proposal module 155c may predict the intent of the user to recommend an instruction to the user. For example, the proposal module 155c may recommend an instruction to the user in consideration of the current state (e.g., a time, a place, context, or an app) of the user.

Figure 3:
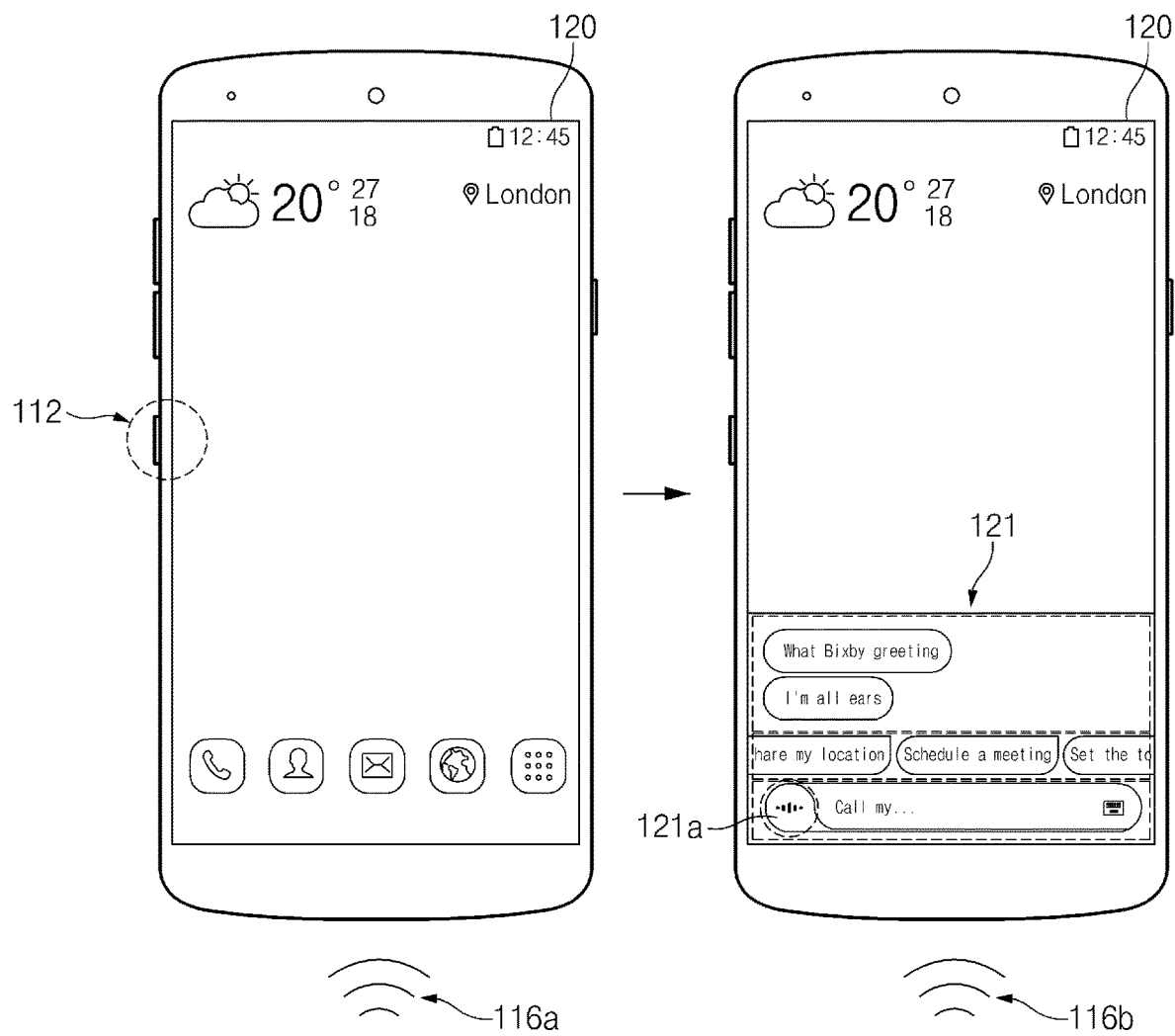
FIG. 3 is view illustrating that an intelligence app of a user terminal is execute d, according to an embodiment of the present disclosure.

FIG. 3 is view illustrating a user terminal while the intelligence app is executed, according to an embodiment of the present disclosure.

FIG. 3 illustrates that the user terminal 100 receives a user input, e.g., 112, 116a, to execute an intelligence app (e.g., a speech recognition app) operating in conjunction with the intelligence agent 151.

According to an embodiment, the user terminal 100 may execute the intelligence app for recognizing a voice following pressing of a hardware key 112. For example, in the case where the user terminal 100 receives the user input through the hardware key 112, the user terminal 100 may display a UI 121 of the intelligence app in the display 120. For example, a user may touch a speech recognition button 121a of the UI 121 of the intelligence app for the purpose of entering a voice 113b in a state where the UI 121 of the intelligence app is displayed in the display 120. For another example, while continuously pressing the hardware key 112 to enter the voice input 116a, the user may enter the voice input 116b.

According to an embodiment, the user terminal 100 may execute the intelligence app for recognizing a voice through the microphone 111. For example, in the case where a specified word command (e.g., wake up!) is entered 113a through the microphone 111, the user terminal 100 may display the UI 121 of the intelligence app in the display 120.

Figure 4:
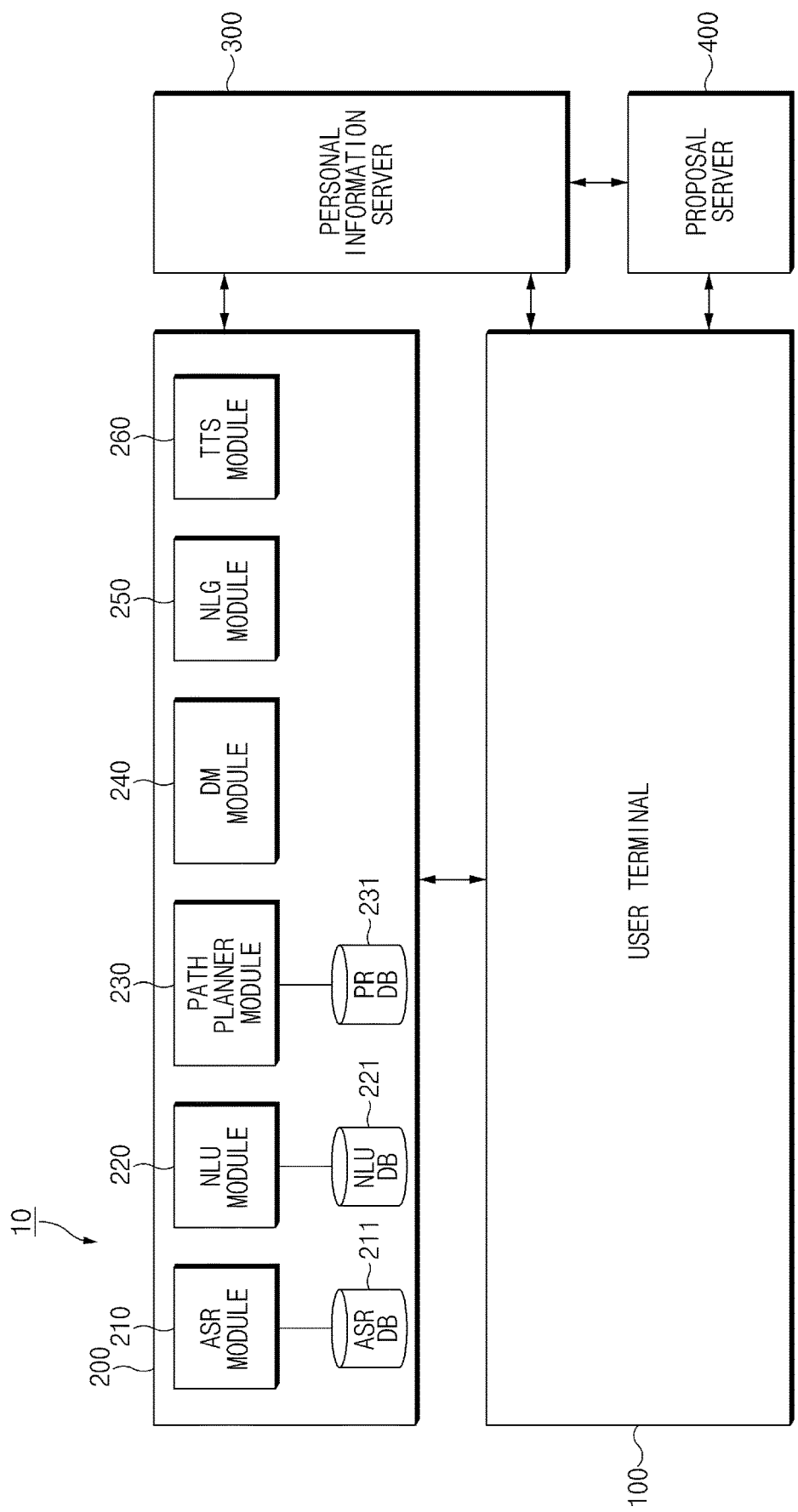
FIG. 4 is a block diagram illustrating an intelligence server of an integrated intelligent system, according to an embodiment of the present disclosure.

FIG. 4 is a block diagram illustrating an intelligence server of an integrated intelligent system, according to an embodiment of the present disclosure.

Referring to FIG. 4, the intelligence server 200 may include an automatic speech recognition (ASR) module 210, a natural language understanding (NLU) module 220, a path planner module 230, a dialogue manager (DM) module 240, a natural language generator (NLG) module 250, or a text to speech (TTS) module 260.

The NLU module 220 or the path planner module 230 of the intelligence server 200 may generate a sequence of tasks.

According to an embodiment, the ASR module 210 may change the user input received from the user terminal 100 to text data. For example, the ASR module 210 may include an utterance recognition module. The utterance recognition module may include an acoustic model and a language model. For example, the acoustic model may include information associated with utterance, and the language model may include unit phoneme information and information about a combination of unit phoneme information. The utterance recognition module may change user utterance to text data by using the information associated with utterance and unit phoneme information. For example, the information about the acoustic model and the language model may be stored in an automatic speech recognition database (ASR DB) 211.

According to an embodiment, the NLU module 220 may grasp user intent by performing syntactic analysis or semantic analysis. The syntactic analysis may divide the user input into syntactic units (e.g., words, phrases, morphemes, and the like) and determine which syntactic elements the divided units have. The semantic analysis may be performed by using semantic matching, rule matching, formula matching, or the like. As such, the NLU module 220 may obtain a domain, intent, or a parameter (or a slot) necessary for the user input to express the intent.

According to an embodiment, the NLU module 220 may determine the intent of the user and parameter by using a matching rule that is divided into a domain, intent, and a parameter (or a slot) necessary to grasp the intent. For example, the one domain (e.g., an alarm) may include a plurality of intent (e.g., alarm settings, alarm cancellation, and the like), and one intent may include a plurality of parameters (e.g., a time, the number of iterations, an alarm sound, and the like). For example, the plurality of rules may include one or more necessary parameters. The matching rule may be stored in a natural language understanding database (NLU DB) 221.

According to an embodiment, the NLU module 220 may grasp the meaning of words extracted from a user input by using linguistic features (e.g., grammatical elements) such as morphemes, phrases, and the like and may match the meaning of the grasped words to the domain and intent to determine user intent. For example, the NLU module 220 may calculate how many words extracted from the user input is included in each of the domain and the intent, for the purpose of determining the user intent. According to an embodiment, the NLU module 220 may determine a parameter of the user input by using the words that are the basis for grasping the intent. According to an embodiment, the NLU module 220 may determine the user intent by using the NLU DB 221 storing the linguistic features for grasping the intent of the user input. According to another embodiment, the NLU module 220 may determine the user intent by using a personal language model (PLM). For example, the NLU module 220 may determine the user intent by using the personalized information (e.g., a contact list or a music list). For example, the PLM may be stored in the NLU DB 221. According to an embodiment, the ASR module 210 as well as the NLU module 220 may recognize the voice of the user with reference to the PLM stored in the NLU DB 221.

According to an embodiment, the NLU module 220 may generate a sequence of tasks based on the intent of the user input and the parameter. For example, the NLU module 220 may select an app to be executed, based on the intent of the user input and may determine a task to be executed, in the selected app. The NLU module 220 may determine the parameter corresponding to the determined task to generate the sequence of tasks. According to an embodiment, the sequence of tasks generated by the NLU module 220 may include information about the app to be executed, the task to be executed in the app, and a parameter necessary to execute the task.

According to an embodiment, the NLU module 220 may generate one sequence of tasks, or a plurality of sequence of tasks based on the intent of the user input and the parameter. For example, the NLU module 220 may receive a sequence of tasks set corresponding to the user terminal 100 from the path planner module 230 and may map the intent of the user input and the parameter to the received sequence of tasks set for the purpose of determining the sequence of tasks.

According to another embodiment, the NLU module 220 may determine the app to be executed, the task to be executed in the app, and a parameter necessary to execute the task based on the intent of the user input and the parameter for the purpose of generating one sequence of tasks or a plurality of sequence of tasks. For example, the NLU module 220 may arrange the app to be executed and the task to be executed in the app by using information of the user terminal 100 depending on the intent of the user input in the form of ontology or a graph model for the purpose of generating the sequence of tasks. For example, the generated sequence of tasks may be stored in a sequence of tasks database (PR DB) 231 through the path planner module 230. The generated sequence of tasks may be added to a sequence of tasks set of the PR DB 231.

According to an embodiment, the NLU module 220 may select at least one sequence of tasks of the generated plurality of sequence of tasks. For example, the NLU module 220 may select an optimal sequence of tasks of the plurality of sequence of tasks. For another example, in the case where only a part of a task is specified based on the user utterance, the NLU module 220 may select a plurality of sequence of tasks. The NLU module 220 may determine one sequence of tasks of the plurality of sequence of tasks depending on an additional input of the user.

According to an embodiment, the NLU module 220 may transmit the sequence of tasks to the user terminal 100 in response to a request for the user input. For example, the NLU module 220 may transmit one sequence of tasks corresponding to the user input to the user terminal 100. For another example, the NLU module 220 may transmit the plurality of sequence of tasks corresponding to the user input to the user terminal 100. For example, in the case where only a part of task is specified based on the user utterance, the plurality of sequence of tasks may be generated by the NLU module 220.

According to an embodiment, the path planner module 230 may select at least one sequence of tasks of the plurality of sequence of tasks.

According to an embodiment, the path planner module 230 may transmit a sequence of tasks set including the plurality of sequence of tasks to the NLU module 220. The plurality of sequence of tasks of the sequence of tasks set may be stored in the PR DB 231 connected to the path planner module 230 in the table form. For example, the path planner module 230 may transmit a sequence of tasks set corresponding to information (e.g., OS information or app information) of the user terminal 100, which is received from the intelligence agent 151, to the NLU module 220. For example, a table stored in the PR DB 231 may be stored for each domain or for each version of the domain.

According to an embodiment, the path planner module 230 may select one sequence of tasks or the plurality of sequence of tasks from the sequence of tasks set to transmit the selected one sequence of tasks or the selected plurality of sequence of tasks to the NLU module 220. For example, the path planner module 230 may match the user intent and the parameter to the sequence of tasks set corresponding to the user terminal 100 to select one sequence of tasks or a plurality of sequence of tasks and may transmit the selected one sequence of tasks or the selected plurality of sequence of tasks to the NLU module 220.

According to an embodiment, the path planner module 230 may generate the one sequence of tasks or the plurality of sequence of tasks by using the user intent and the parameter. For example, the path planner module 230 may determine the app to be executed and the task to be executed in the app based on the user intent and the parameter for the purpose of generating the one sequence of tasks or the plurality of sequence of tasks. According to an embodiment, the path planner module 230 may store the generated sequence of tasks in the PR DB 231.

According to an embodiment, the path planner module 230 may store the sequence of tasks generated by the NLU module 220 in the PR DB 231. The generated sequence of tasks may be added to the sequence of tasks set stored in the PR DB 231.

According to an embodiment, the table stored in the PR DB 231 may include a plurality of sequence of tasks or a plurality of sequence of tasks sets. The plurality of sequence of tasks or the plurality of sequence of tasks sets may reflect the kind, version, type, or characteristic of a device performing each sequence of tasks.

According to an embodiment, the DM module 240 may determine whether the user intent grasped by the NLU module 220 is clear. For example, the DM module 240 may determine whether the user intent is clear, based on whether the information of a parameter is sufficient. The DM module 240 may determine whether the parameter grasped by the NLU module 220 is sufficient to perform a task. According to an embodiment, in the case where the user intent is not clear, the DM module 240 may perform a feedback for making a request for necessary information to the user. For example, the DM module 240 may perform a feedback for making a request for information about the parameter for grasping the user intent.

According to an embodiment, the DM module 240 may include a content provider module. In the case where the content provider module executes a task based on the intent and the parameter grasped by the NLU module 220, the content provider module may generate the result obtained by performing a task corresponding to the user input. According to an embodiment, the DM module 240 may transmit the result generated by the content provider module as the response to the user input to the user terminal 100.

According to an embodiment, the natural language generating module NLG 250 may change specified information to a text form. Information changed to the text form may be a form of a natural language utterance. For example, the specified information may be information about an additional input, information for guiding the completion of a task corresponding to the user input, or information for guiding the additional input of the user (e.g., feedback information about the user input). The information changed to the text form may be displayed in the display 120 after being transmitted to the user terminal 100 or may be changed to a voice form after being transmitted to the TTS module 260.

According to an embodiment, the TTS module 260 may change information of the text form to information of a voice form. The TTS module 260 may receive the information of the text form from the NLG module 250, may change the information of the text form to the information of a voice form, and may transmit the information of the voice form to the user terminal 100. The user terminal 100 may output the information of the voice form to the speaker 130

According to an embodiment, the NLU module 220, the path planner module 230, and the DM module 240 may be implemented with one module. For example, the NLU module 220, the path planner module 230 and the DM module 240 may be implemented with one module, may determine the user intent and the parameter, and may generate a response (e.g., a sequence of tasks) corresponding to the determined user intent and parameter. As such, the generated response may be transmitted to the user terminal 100.

In certain embodiments, the ASR DB 211, NLU DB 221, and PR DB 231 can include a registry of each task 141*b*, 143*b* in each electronic device. Each task 141*b*, 143*b* can be associated with audible word data that is commonly associated with it. When the ASR module 210, NLU module 220, and Path Planner Module 230 receive the voice data, the foregoing modules can identify tasks 141*b*, 143*b*, that are associated with portions of the voice data. The identified tasks 141*b*, 143*b*, can then be used to generate the sequence of tasks.

Figure 5:
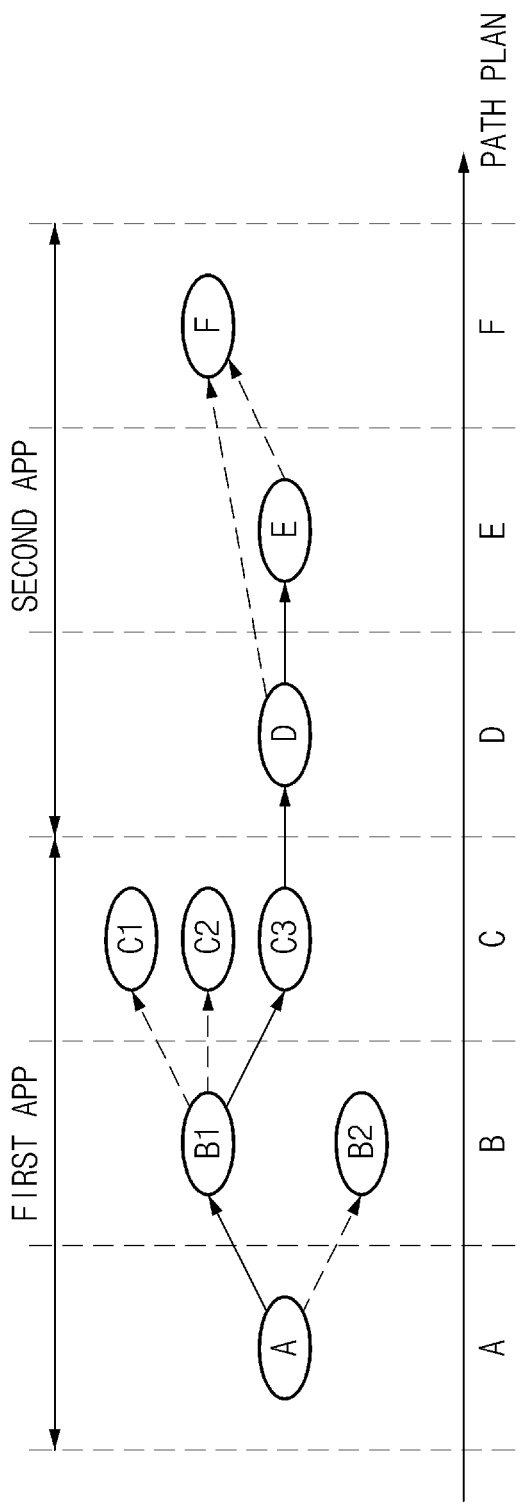
FIG. 5 is a diagram illustrating a sequence of tasks generating method of an NLU module, according to an embodiment of the present disclosure.

FIG. 5 is a diagram illustrating a sequence of tasks generating method of an NLU module, according to an embodiment of the present disclosure.

Referring to FIG. 5, according to an embodiment, the NLU module 220 may divide the function of an app into unit tasks (e.g., A to F) and may store the divided unit tasks in the PR DB 231. For example, the NLU module 220 may store a sequence of tasks set, which includes a plurality of sequence of tasks A-B1-C1, A-B1-C2, A-B1-C3-D-F, and A-B1-C3-D-E-F divided into unit tasks, in the PR DB 231.

According to an embodiment, the PR DB 231 of the path planner module 230 may store the sequence of tasks set for performing the function of an app. The sequence of tasks set may include a plurality of sequence of tasks each of which includes a plurality of tasks. A task executed depending on a parameter input to each of the plurality of tasks may be sequentially arranged in the plurality of sequence of tasks. According to an embodiment, the plurality of sequence of tasks implemented in a form of ontology or a graph model may be stored in the PR DB 231.

According to an embodiment, the NLU module 220 may select an optimal sequence of tasks A-B1-C3-D-F of the plurality of sequence of tasks A-B1-C1, A-B1-C2, A-B1-C3-D-F, and A-B1-C3-D-E-F corresponding to the intent of a user input and the parameter.

According to an embodiment, in the case where there is no sequence of tasks completely matched to the user input, the NLU module 220 may transmit a plurality of rules to the user terminal 100. For example, the NLU module 220 may select a sequence of tasks (e.g., A-B1) partly corresponding to the user input. The NLU module 220 may select one or more sequence of tasks (e.g., A-B1-C1, A-B1-C2, A-B1-C3-D-F, and A-B1-C3-D-E-F) including the sequence of tasks (e.g., A-B1) partly corresponding to the user input and may transmit the one or more sequence of tasks to the user terminal 100.

According to an embodiment, the NLU module 220 may select one of a plurality of sequence of tasks based on an input added by the user terminal 100 and may transmit the selected one sequence of tasks to the user terminal 100. For example, the NLU module 220 may select one sequence of tasks (e.g., A-B1-C3-D-F) of the plurality of sequence of tasks (e.g., A-B1-C1, A-B1-C2, A-B1-C3-D-F, and A-B1-C3-D-E-F) depending on the user input (e.g., an input for selecting C3) additionally entered by the user terminal 100 for the purpose of transmitting the selected one sequence of tasks to the user terminal 100.

According to another embodiment, the NLU module 220 may determine the intent of a user and the parameter corresponding to the user input (e.g., an input for selecting C3) additionally entered by the user terminal 100 for the purpose of transmitting the user intent or the parameter to the user terminal 100. The user terminal 100 may select one sequence of tasks (e.g., A-B1-C3-D-F) of the plurality of sequence of tasks (e.g., A-B1-C1, A-B1-C2, A-B1-C3-D-F, and A-B1-C3-D-E-F) based on the transmitted intent or the transmitted parameter.

As such, the user terminal 100 may complete the tasks of the apps 141 and 143 based on the selected one sequence of tasks.

According to an embodiment, in the case where a user input in which information is insufficient is received by the intelligence server 200, the NLU module 220 may generate a sequence of tasks partly corresponding to the received user input. For example, the NLU module 220 may transmit the partly corresponding sequence of tasks to the intelligence agent 151. The intelligence agent 151 may transmit the partly corresponding sequence of tasks to the execution manager module 153, and the execution manager module 153 may execute the first app 141 depending on the sequence of tasks. The execution manager module 153 may transmit information about an insufficient parameter to the intelligence agent 151 while executing the first app 141. The intelligence agent 151 may make a request for an additional input to a user by using the information about the insufficient parameter. If the additional input is received by the user, the intelligence agent 151 may transmit and process the additional input to the intelligence server 200. The NLU module 220 may generate a sequence of tasks to be added, based on the intent of the user input additionally entered and parameter information and may transmit the sequence of tasks to be added, to the intelligence agent 151. The intelligence agent 151 may transmit the sequence of tasks to the execution manager module 153 and may execute the second app 143.

According to an embodiment, in the case where a user input, in which a portion of information is missed, is received by the intelligence server 200, the NLU module 220 may transmit a user information request to the personal information server 300. The personal information server 300 may transmit information of a user entering the user input stored in a persona database to the NLU module 220. The NLU module 220 may select a sequence of tasks corresponding to the user input in which a part of a task is missed, by using the user information. As such, even though the user input in which a portion of information is missed is received by the intelligence server 200, the NLU module 220 may make a request for the missed information to receive an additional input or may determine a sequence of tasks corresponding to the user input by using user information.

Figure 6:
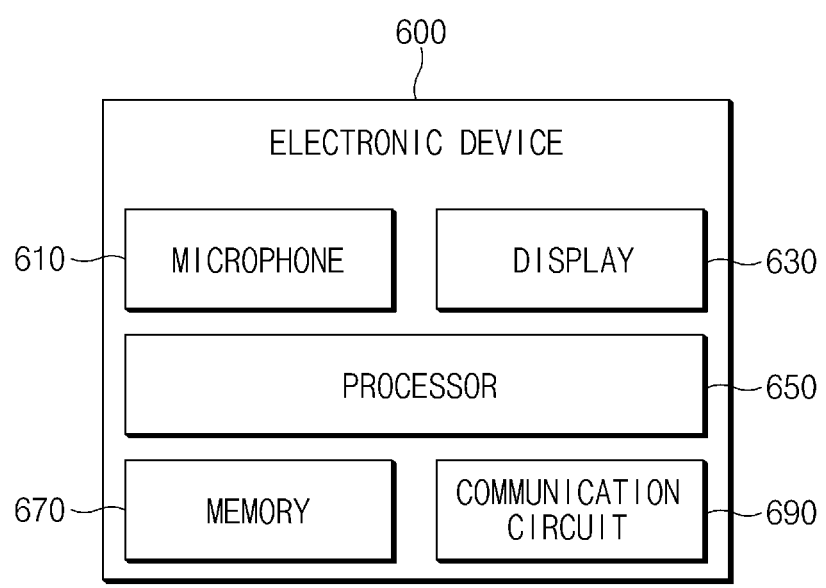
FIG. 6 is a block diagram illustrating an electronic device associated with voice data processing, according to an embodiment of the present disclosure.

FIG. 6 is a block diagram illustrating an electronic device associated with voice data processing, according to an embodiment of the present disclosure. The electronic device 600 illustrated in FIG. 6 may include a configuration that is the same as or similar to the configuration of the user terminal 100 of the above-mentioned drawings.

According to an embodiment, if a hardware key (e.g., the hardware key 112) disposed on one surface of the housing of the electronic device 600 is pressed or a specified voice (e.g., wake up!) is entered through a microphone 610 (e.g., the microphone 111), the electronic device 600 may launch an intelligence app such as a voice recognition app stored in a memory 670 (e.g., the memory 140). In this case, the electronic device 600 may display the UI (e.g., the UI 121) of the intelligence app on the screen of a display 630 (e.g., the display 120).

According to an embodiment, in a state where the UI of the intelligence app is displayed in the display 630, a user may touch a voice input button (e.g., the speech recognition button 121*a*) included in the UI of the intelligence app for the purpose of entering a voice. If the voice input button included in the UI of the intelligence app is touched, the electronic device 600 may enter a standby state for receiving a user's voice input and may receive the user's voice input through the microphone 610 in the standby state. In any embodiment, in the case where the hardware key (e.g., a button mapped to the execution of an intelligence app and a voice input function) is pressed and held (e.g., in the case where the hardware key is held in a pressed state), the electronic device 600 may launch the intelligence app and may activate the microphone 610 so as to receive a voice input. In addition, if receiving the user's voice input, the electronic device 600 may transmit voice data corresponding to the voice input to an external electronic device (e.g., the intelligence server 200) through a communication circuit 690. In this case, the external electronic device may convert the received voice data to text data, may determine a sequence of tasks including sequence information about tasks (or operations) for performing the function of at least one app included in the electronic device 600, based on the converted text data, and may transmit the determined sequence of tasks to the electronic device 600. Afterwards, the electronic device 600 may perform tasks depending on the sequence of tasks received from the external electronic device. In this regard, the sequence information about the tasks may include identification information of each task, information about a parameter required to perform each task, information about the execution sequence of tasks, or the like.

According to an embodiment, while performing tasks depending on the sequence of tasks received from the external electronic device, in the case where a task (i.e., the delayed task), which is not completed within a specified time (e.g., time-out time), is present, the electronic device 600 may increase the time-out time of the delayed task and may switch the execution of the delayed task to the task in background. Alternatively, the electronic device 600 may increase the time-out time of the delayed task and may display the execution state information (e.g., execution progress) of the delayed task on at least part of a screen and may provide a user interface such that a user input (e.g., touch) is possible. That is, the electronic device 600 may prevent the processing of the sequence of tasks from being canceled due to the time-out of the delayed task and may provide a method of performing another task or the function of another app installed in the electronic device 600.

Referring to FIG. 6, the electronic device 600 performing the above-described function may include the microphone 610, the display 630, a processor 650, the memory 670, and the communication circuit 690. However, a configuration of the electronic device 600 is not limited thereto. According to various embodiments, the electronic device 600 may further include at least other elements in addition to the aforementioned elements. For example, the electronic device 600 may further include a speaker (e.g., the speaker 130) that outputs the voice signal generated in the electronic device 600 to the outside, for the purpose of notifying the user of the processing result of the voice input. For example, the speaker may convert an electrical signal to vibration to transmit sound waves into the air.

According to an embodiment, the microphone 610 may receive the user's utterance as the voice signal. For example, the microphone 610 may convert the vibration energy caused by the user's utterance into an electrical signal and may transmit the converted electrical signal to the processor 650.

According to an embodiment, the display 630 may display various content (e.g., texts, images, videos, icons, symbols, or the like) to a user. According to an embodiment, the display 630 may include a touch screen. For example, the display 630 may obtain a touch, gesture, proximity, or hovering input using an electronic pen or a part of the user's body (e.g., finger).

According to an embodiment, the processor 650 may perform data processing or an operation associated with control and/or communication of at least one other element (s) of the electronic device 600. For example, the processor 650 may drive an operating system (OS) or an application program to control a plurality of hardware or software elements connected to the processor 650 and may process a variety of data or may perform an arithmetic operation. The processor 650 may include one or more of a central processing unit (CPU), an application processor (AP), or a communication processor (CP). According to an embodiment, the processor 650 may be implemented with a system-on-chip (SoC).

According to an embodiment, the processor 650 may launch an app (e.g., intelligence app) stored in the memory 670 and may output the execution screen of an app to the display 630. For example, the processor 650 may organize the context (e.g., UI) associated with an app in a screen to output the content to the display 630.

According to an embodiment, if the voice input button is selected, the processor 650 may enter a standby state for receiving a voice input. For example, the standby state may be a state where the microphone 610 is activated such that a voice input is possible. Furthermore, for the purpose of notifying the user that the processor 650 enters the standby state, the processor 650 may output a screen associated with the standby state to the display 630. For example, the processor 650 may notify the display 630 that the microphone 610 has been activated, and thus, may notify the user that the voice input is possible.

According to an embodiment, if the voice input is received through the microphone 610, the processor 650 may transmit voice data corresponding to the voice input to an external electronic device (e.g., the intelligence server 200) through the communication circuit 690. Moreover, the processor 650 may receive the sequence of tasks determined based on text data generated by converting the voice data to data in the text format, from the external electronic device through the communication circuit 690. In any embodiment, if the voice input is received through the microphone 610, the processor 650 may transmit the text data generated by converting the voice data corresponding to the voice input to data in the text format, to the external electronic device through the communication circuit 690.

According to an embodiment, the processor 650 may receive a sequence of tasks including sequence information about tasks that performs the function of at least one app stored in the memory 670, from the external electronic device (e.g., the intelligence server 200) through the communication circuit 690. If receiving the sequence of tasks, the processor 650 may execute the tasks based on the sequence of tasks. For example, the processor 650 may verify tasks to be executed by using identification information of each task included in the sequence of tasks and may sequentially execute the tasks based on execution sequence in the sequence of the tasks.

According to an embodiment, in the case where the delayed task is present while the tasks are sequentially executed, the processor 650 may increase the time-out time of the delayed task. For example, the processor 650 may increase the time-out time set such that the execution of the delayed task is completed. In any embodiment, the processor 650 may differently set the time-out time depending on a type of a task and may differently set a time during which the time-out time increases, depending on a type of a task. For another example, in the case where the delayed task is not executed within the increased time-out time even though the processor 650 increases the time-out time of the delayed task, the processor 650 may output information about the delay of the task to the display 630 and may re-extend the time-out time of the task or may provide a user interface for canceling the execution of the task.

According to an embodiment, the processor 650 may switch the execution of the delayed task to the execution in background. For example, the processor 650 may perform the delayed task in background and may perform another task associated with the delayed task in foreground or may perform the function of another app included in the memory 670 in foreground. For example, the operation of performing the delayed task in background may include an operation in which the processor 650 restricts a system resource used associated with the delayed task so as not to occupy a user interface.

"Foreground" processing shall refer to immediate current processing by the processor, while "background" processing shall refer to a process that is processed with restrictions, specifically restricted to not display a user interface.

According to an embodiment, the processor 650 may determine whether another task, which is executable regardless of the execution result of the delayed task, from among tasks included in the sequence of tasks is present. In this case, the processor 650 may switch the execution of the delayed task to the execution in background and may perform the other executable task in foreground.

According to an embodiment, in the case where a task, in which necessary parameter information is absent, from among other tasks other than the delayed task is present, the processor 650 may proceed to a procedure for obtaining the parameter information. For example, for the purpose of obtaining the parameter information, the processor 650 may output a user interface associated with the parameter information to the display 630. In this regard, for example, the user interface associated with the parameter information may include a button object requiring the user's touch input, a display object inducing the user's voice input, or the like. As such, while continuing to perform the delayed task, the processor 650 may receive a user input necessary to complete the processing of the sequence of tasks.

According to an embodiment, the processor 650 may receive a plurality of sequence of tasks from the intelligence server 200; if a task included in a sequence of tasks among the sequence of tasks is delayed, the processor 650 may perform tasks included in another sequence of tasks while performing the delayed task in background.

According to an embodiment, while performing the delayed task in background, the processor 650 may perform a function similar to the delayed task. For example, in the case where the delayed task is performed as a stage for performing a first function, while performing the delayed task in background, the processor 650 may perform a second function similar to the first function. For example, in the case where the first function is a function to output a sound to a first output path (e.g., Bluetooth earphone), the processor 650 may perform the second function to output a sound to a second output path (e.g., speaker). In this case, the user may verify that the similar function is performed, and then the processor 650 may receive the verification result from the user.

According to an embodiment, the processor 650 may output an object for providing a notification of the presence of the delayed task, to the display 630. For example, the object may include at least one of a text saying that the delayed task is present, and a specified icon (e.g., the icon of an intelligence app such as a speech recognition app, or the like). In the case where the object includes an icon, if the icon is selected by the user's touch input, the identification information of the delayed task, the execution time of the delayed task, the time-out time of the delayed task, the remaining time until the time-out time of the delayed task, a button object for canceling the delayed task, or the like may be output to the display 630. In any embodiment, the processor 650 may express the execution time of the delayed task or the remaining time until the time-out time of the delayed task by using an object (e.g., a progress bar) capable of expressing the flow of time.

According to an embodiment, if the execution of the delayed task is completed, the processor 650 may determine whether other tasks to be executed are present; in the case where the tasks are present, the processor 650 may perform the tasks based on the sequence information of the tasks. In any embodiment, the processor 650 may exclude a task, which is already executed and then is completed, from among the tasks from the execution target. For example, in the case where another task, which is executed in foreground and then is completed, while the processor 650 performs the delayed task in background, the processor 650 may exclude the other task from the execution target.

According to an embodiment, the memory 670 may store a command or data associated with at least one other element of the electronic device 600. According to an embodiment, the memory 670 may store software and/or a program. For example, the memory 670 may store an app (e.g., intelligence app) associated with an artificial intelligence technology. For example, the intelligence app may include instructions associated with a function to receive the user's utterance as a voice signal and to process the voice signal, instructions to receive sequence information about tasks for performing the function of at least one app stored in the memory 670 from an external electronic device, instructions to perform the tasks based on the sequence information, instructions to increase the time-out time of the delayed task in the case where the delayed task among the tasks is present, or instructions to switch the execution of the delayed task to the execution in background. However, instructions included in the intelligence app are not limited thereto. According to various embodiments, the intelligence app may further include at least another instruction in addition to the above-mentioned instructions, and at least one of the above-mentioned instructions may be omitted. In addition, instructions included in the software and/or program stored in the memory 670 may be loaded onto a volatile memory by the processor 650 and may be processed depending on a specified program routine.

According to an embodiment, the communication circuit 690 may support the communication channel establishment between the electronic device 600 and an external electronic device (e.g., the intelligence server 200, the personal information server 300, or the suggestion server 400) and the execution of wired or wireless communication through the established communication channel.

As described above, according to various embodiments, an electronic device (e.g., the electronic device 600) may include a display (e.g., the display 630), a microphone (e.g., the microphone 610) configured to receive a user's voice, a communication circuit (e.g., the communication circuit 690) configured to communicate with an external electronic device, a memory (e.g., the memory 670) configured to store at least one application, and a processor (e.g., the processor 650) electrically connected to the microphone, the communication circuit, the display, and the memory. The processor may be configured to obtain voice data corresponding to the user's voice received through the microphone, transmit the voice data to the external electronic device through the communication circuit, receive sequence information of tasks for performing a first function of the at least one application, which is determined based on the voice data, from the external electronic device through the communication circuit, and while performing the tasks based on the sequence information, if it is determined that a first task, execution of which is not completed within a specified time, is present, extend a time-out time of the first task and switch the execution of the first task to the execution in background.

According to various embodiments, the processor may be further configured to output an object for providing a notification of presence of the first task to the display if the execution of the first task is switched to the execution in background.

According to various embodiments, the processor may be further configured to output state information about the first task to the display if a touch input to select the object occurs.

According to various embodiments, the processor may be further configured to perform the second task if it is determined that a second task, which is executable regardless of the execution result of the first task, from among the tasks is present.

According to various embodiments, the processor may be further configured to provide a user interface to obtain the user input if it is determined that the second task is a task requiring a user input.

According to various embodiments, the processor may be further configured to output a screen including an object which allows a second function of the at least one application to be performed, to the display if it is determined that the second task, which is executable, from among the tasks is absent.

According to various embodiments, the processor may be further configured to output an object which suggests the execution of a second function similar to the first function, to the display.

According to various embodiments, the processor may be further configured to extend the extended time-out time again if the execution of the first task is not completed within the extended time-out time.

According to various embodiments, the processor may be further configured to determine whether a second task, which is associated with the first task, from among the tasks is present if the execution of the first task is completed within the extended time-out time, and perform the second task if the second task is present.

As described above, according to various embodiments, an electronic device (e.g., the electronic device 600) may include a housing, a touch screen display (e.g., the display 630) disposed inside the housing and exposed through a first portion of the housing, a microphone (e.g., the microphone 610) disposed inside the housing and exposed through a second portion of the housing, at least one speaker (e.g., the speaker 130) disposed inside the housing and exposed through a third portion of the housing, a wireless communication circuit (e.g., the communication circuit 690) disposed inside the housing, a processor (e.g., the processor 650) disposed inside the housing and electrically connected to the touch screen display, the microphone, the speaker, and the wireless communication circuit, and a memory (e.g., the memory 670) disposed inside the housing and electrically connected to the processor. The memory may store a first application including a first user interface, and the memory may store instructions that, when executed, cause the processor to receive a user input including a request for performing a task by using the first application, through at least one of the touch screen display or the microphone, transmit data associated with the user input to an external server through the wireless communication circuit, receive a response including information about sequence of states of the electronic device for performing the task, from the external server through the wireless communication circuit, wherein the electronic device is in the sequence of states to perform the task such that each of the states is completed within a specified time, and extend the specified time for the selected state if one selected state associated with the first application lasts longer than the specified time.

According to various embodiments, the memory may store instructions, when executed, causing the processor to display a second user interface if receiving the user input, and display at least part of the first user interface if the specified time for the selected state is extended.

Figure 7:
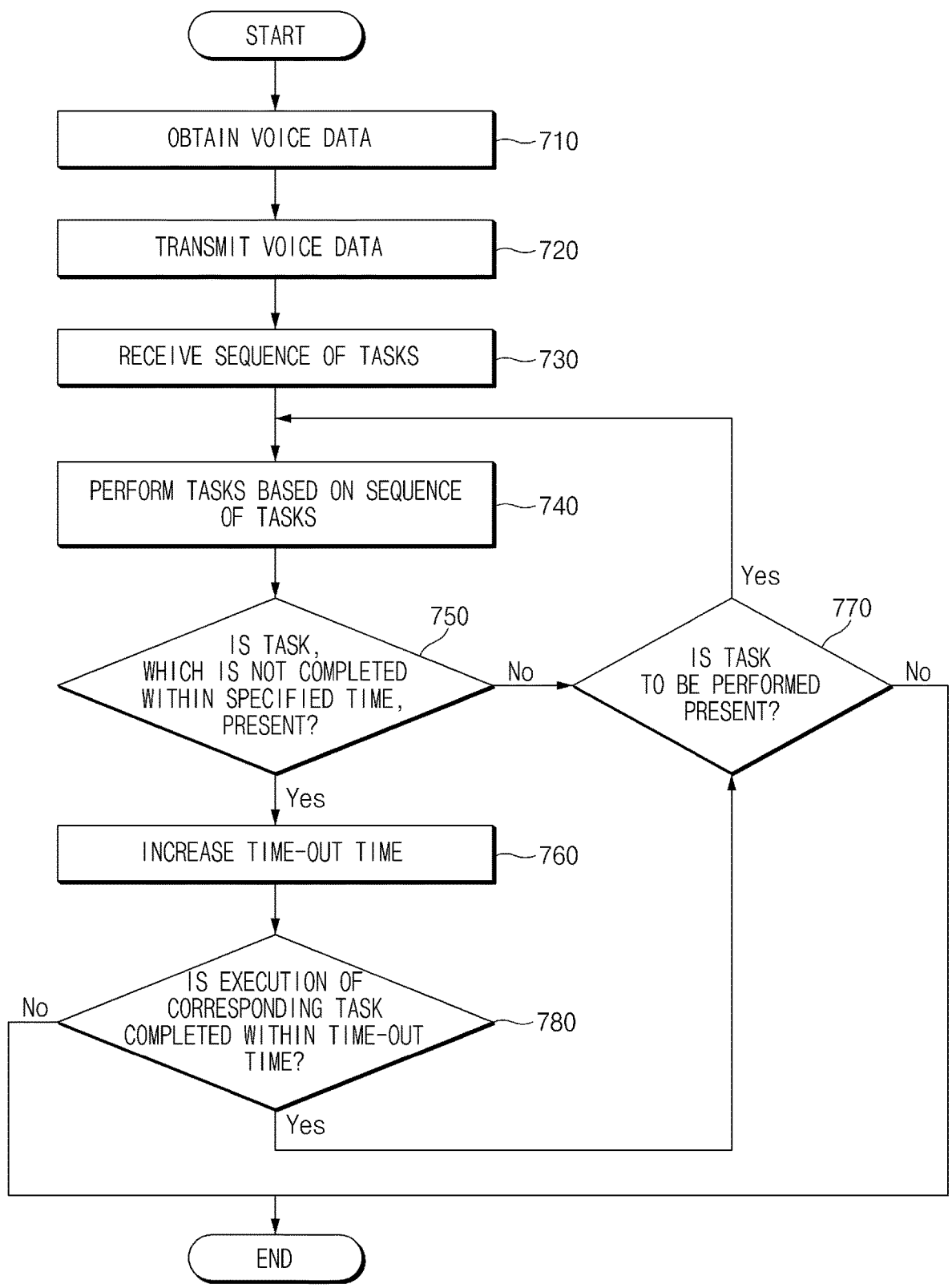
FIG. 7 is a flowchart illustrating an operating method of an electronic device associated with voice data processing, according to an embodiment of the present disclosure.

FIG. 7 is a flowchart illustrating an operating method of an electronic device associated with voice data processing, according to an embodiment of the present disclosure.

Referring to FIG. 7, in operation 710, an electronic device (e.g., the processor (e.g., the processor 650) of the electronic device 600) may obtain voice data. For example, if a user utters a voice input, the processor may obtain the voice data corresponding to the voice input through a microphone (e.g., the microphone 610).

In operation 720, the processor according to an embodiment may transmit the obtained voice data to an external electronic device (e.g., the intelligence server 200) through a communication circuit (e.g., the communication circuit 690). In this case, the external electronic device may convert the received voice data to text data and may determine (or generate) sequence information about tasks for performing the function of at least one app installed in a memory (e.g., the memory 670), based on the converted text data. In any embodiment, the processor may convert the obtained voice data to text data and may transmit the converted text data to an external electronic device through a communication circuit. In this case, the external electronic device may determine (or generate) the sequence information about the tasks based on the received text data.

In operation 730, the processor according to an embodiment may receive a sequence of tasks from the external electronic device through the communication circuit. That is, the processor may receive the sequence of tasks for performing the function of the at least one app, which is determined based on the voice data by the external electronic device, from the external electronic device through the communication circuit. The sequence information about the tasks may include identification information of each task, information about a parameter required to perform each task, information about the execution sequence of tasks, or the like.

In operation 740, the processor according to an embodiment may perform the tasks based on the sequence information. For example, the processor may sequentially perform the tasks based on the sequence of tasks.

In operation 750, the processor according to an embodiment may determine whether a task (i.e., the delayed task), which is not completed within a specified time (e.g., time-out time), from among the tasks is present in the sequence of tasks. For example, an execution manager module (e.g., the execution manager module 153) included in the processor may sequentially transmit an execution request for each of the tasks to the app and may receive an execution completion response to each of the tasks from the app. In this case, if not receiving the execution completion response to a task within the specified time, the execution manager module may verify that the corresponding task is delayed.

In this regard, the time-out time of a task may be set to a specific time per task unit and may be differently set depending on a type of task for each task. For example, in the case of a task of which the execution time is changed depending on the number of files such as file download, file deletion, or the like, the time-out time may be dynamically set in consideration of the number of files.

Alternatively, the time-out time of a task may be set within the execution manager module, and the execution manager module may use the time-out time stored in a memory. In any embodiment, the time-out time of the task may be stored in the intelligence server 200 for each task and may be managed. In this case, the intelligence server 200 may include the time-out time of each task in the sequence information about tasks included in a sequence of tasks and may transmit the sequence of tasks to the electronic device.

According to an embodiment, in the case where the execution of a task is not completed (i.e., the delayed task), within a specified time, in operation 760, the processor may increase the time-out time of the delayed task and may switch the execution of the delayed task to the execution in background. That is, the processor may increase the time-out time of the delayed task for the purpose of preventing the processing of the sequence of tasks from being canceled due to the time-out of the delayed task. Furthermore, the processor may support the execution of another task or the function of another application installed in a memory by switching the execution of the delayed task to the execution of in background. The time during which the time-out time is increased may be set to a specific time per task unit and may be differently set depending on a type of task for each task.

According to an embodiment, in the case where a task (i.e., the delayed task), the execution of which is not completed within a specified time, is absent, in operation 770, the processor may determine whether a task to be performed is present. For example, the processor may determine whether another task associated with the last executed task among the tasks is present. In the case where another task to be performed is present, the processor may return to operation 740. That is, the processor may perform the other task to be performed, based on the sequence information. Afterwards, as described in operation 750, if the execution of the other task is not completed within a specified time, the processor may perform operation 760; if the execution of the other task is completed within a specified time, the processor may perform operation 770.

After increasing the time-out time of the delayed task, in operation 780, the processor according to an embodiment may determine whether the execution of the corresponding task is completed within the time-out time. For example, similarly to operation 750, the execution manager module included in the processor may transmit the execution request for the task to the app; however, if not receiving the execution completion response to the task within the time-out time, the execution manager module may determine whether the execution of the task is not completed.

According to an embodiment, if the execution of the task, the time-out time of which is increased, is completed, the processor may return to operation 770. For example, the processor may determine whether another task to be performed is present.

According to an embodiment, if the execution of a task, the time-out time of which is increased, is not completed, the processor may cancel the execution of the task. In this case, the processor may cancel the processing of a sequence of tasks in which the task is included. In any embodiment, before canceling the processing of the sequence of tasks in which the task is included, the processor may provide a user with a user interface, through which the user determines whether to cancel the processing of the sequence of tasks. For example, the processor may output a voice for querying whether to cancel the processing of the sequence of tasks, through a speaker (e.g., the speaker 130). In this case, if the user utters a voice command to cancel the processing of the sequence of tasks, the processor may cancel the processing of the sequence of tasks. In any embodiment, the processor may cancel the execution of the task and may perform a task having a function similar to the function of the task. In this case, the user may determine whether the task having the similar function is performed, and then the processor may receive the determination result from the user. For another example, the processor may extend the time-out time of the task again.

Figure 8:
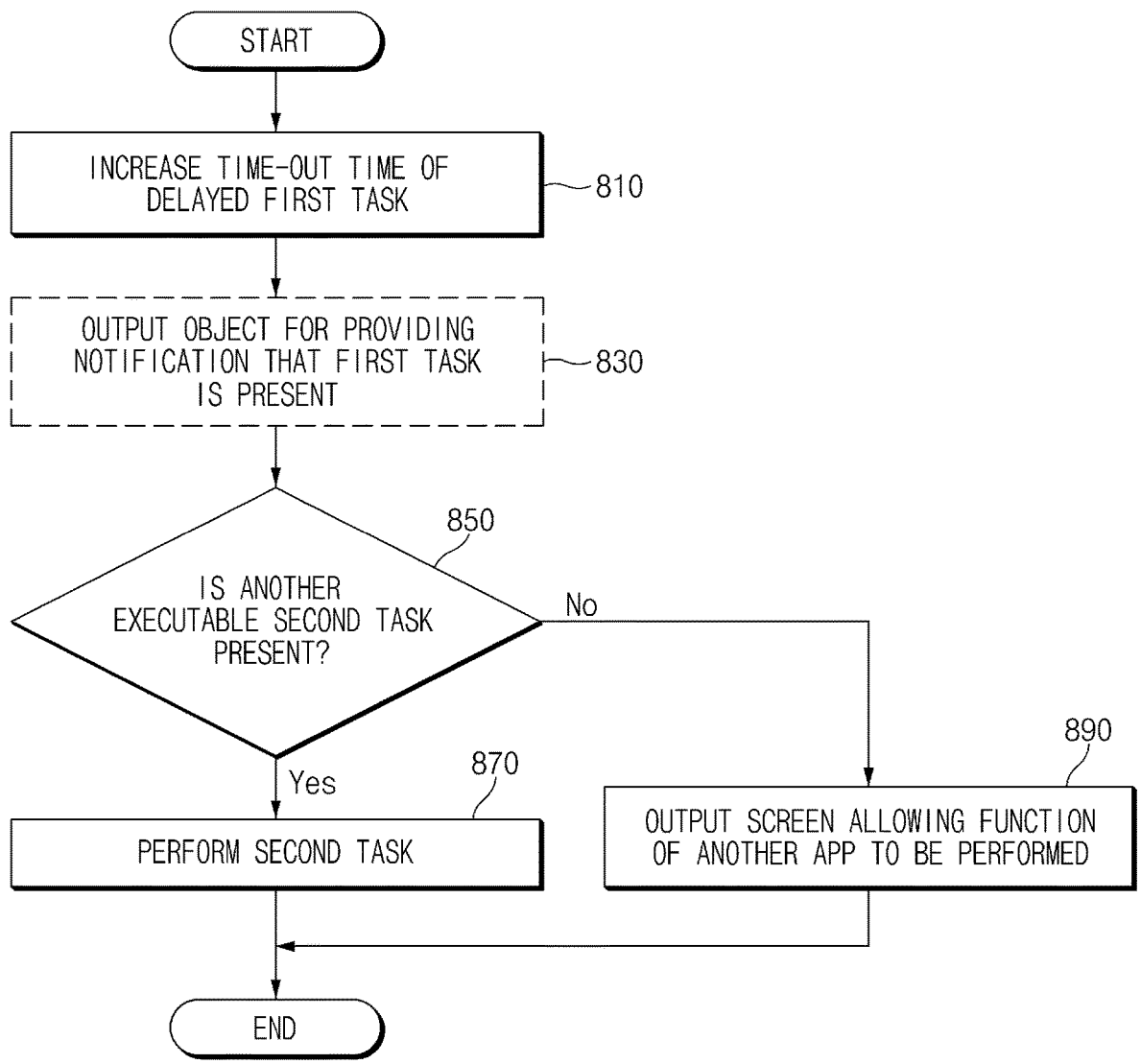
FIG. 8 is a flowchart illustrating an operating method of an electronic device associated with a switch to the background of a task, according to an embodiment of the present disclosure.

FIG. 8 is a flowchart illustrating an operating method of an electronic device associated with a switch to the background of a task, according to an embodiment of the present disclosure.

Referring to FIG. 8, while performing tasks included in a sequence of tasks received from an external electronic device (e.g., the intelligence server 200), if the execution of a first task among the tasks is not completed within a specified time, in operation 810, a processor (e.g., the processor 650) of an electronic device (e.g., the electronic device 600) may increase the time-out time of the delayed first task and may switch the execution of the first task to the first task in background.

In operation 830, the processor according to an embodiment may output an object for providing a notification that the delayed task is present, to a display (e.g., the display 630). That is, the processor may output an object for providing a notification of the presence of the first task. For example, the object may include at least one of a text saying that the delayed task (e.g., the first task) is present, and a specified icon (e.g., the icon of an intelligence app such as a speech recognition app, or the like). In an embodiment, the execution of the operation 830 may be omitted.

According to an embodiment, in the case where the object includes an icon, if the icon is selected by the user's touch input, the processor may output the identification information of the delayed task, the execution time of the delayed task, the time-out time of the delayed task, the remaining time until the time-out time of the delayed task, a button object for canceling the delayed task, or the like to the display. In any embodiment, the processor may express the execution time of the delayed task or the remaining time until the time-out time of the delayed task by using an object (e.g., a progress bar) capable of expressing the flow of time.

In operation 850, the processor according to an embodiment may determine whether another executable task (e.g., a second task) is present, regardless of the execution result of the delayed task (e.g., a first task). In the case where the executable second task is present, in operation 870, the processor may perform the second task. In the case where the executable second task is not present, in operation 890, the processor according to an embodiment may output a screen, which allows the function of another app installed in a memory to be performed, to a display. For example, the processor may switch the output of the screen associated with the delayed task to the background and may output a screen (e.g., home screen) that allows the function of another app to be performed, in a foreground state to the display.

In this regard, the state where the output of the screen is output to the background of the screen may include a state where the process associated with the output of the screen is not terminated but a screen output is terminated, a state where at least part of a screen is overlapped with a screen output in foreground, a state where an object, which corresponds to a user interface, from among objects included in the screen is deactivated, or the like.

As described above, according to various embodiments, a voice data processing method of an electronic device (e.g., the electronic device 600) may include obtaining voice data corresponding to a user's voice received through a microphone, transmitting the voice data to an external electronic device connected through a communication circuit, receiving sequence information of tasks for performing a first function of at least one application, which is determined based on the voice data, from the external electronic device through the communication circuit, and while performing the tasks based on the sequence information, if it is determined that a first task, execution of which is not completed within a specified time, is present, extending a time-out time of the first task and switching the execution of the first task to the execution in background.

According to various embodiments, the voice data processing method may further include outputting an object for providing a notification of presence of the first task to a display if the execution of the first task is switched to the execution in background.

According to various embodiments, the voice data processing method may further include outputting state information about the first task to the display if a touch input to select the object occurs.

According to various embodiments, the voice data processing method may further include performing the second task if it is determined that a second task, which is executable regardless of the execution result of the first task, from among the tasks is present.

According to various embodiments, the voice data processing method may further include providing a user interface to obtain the user input if it is determined that the second task is a task requiring a user input.

According to various embodiments, the voice data processing method may further include outputting a screen including an object which allows a second function of the at least one application to be performed, to a display if it is determined that the second task, which is executable, from among the tasks is absent.

According to various embodiments, the voice data processing method may further include outputting an object which suggests the execution of a second function similar to the first function, to a display.

According to various embodiments, the voice data processing method may further include extending the extended time-out time again if the execution of the first task is not completed within the extended time-out time.

According to various embodiments, the voice data processing method may further include determining whether a second task, which is associated with the first task, from among the tasks is present if the execution of the first task is completed within the extended time-out time, and performing the second task if the second task is present.

Figure 9:
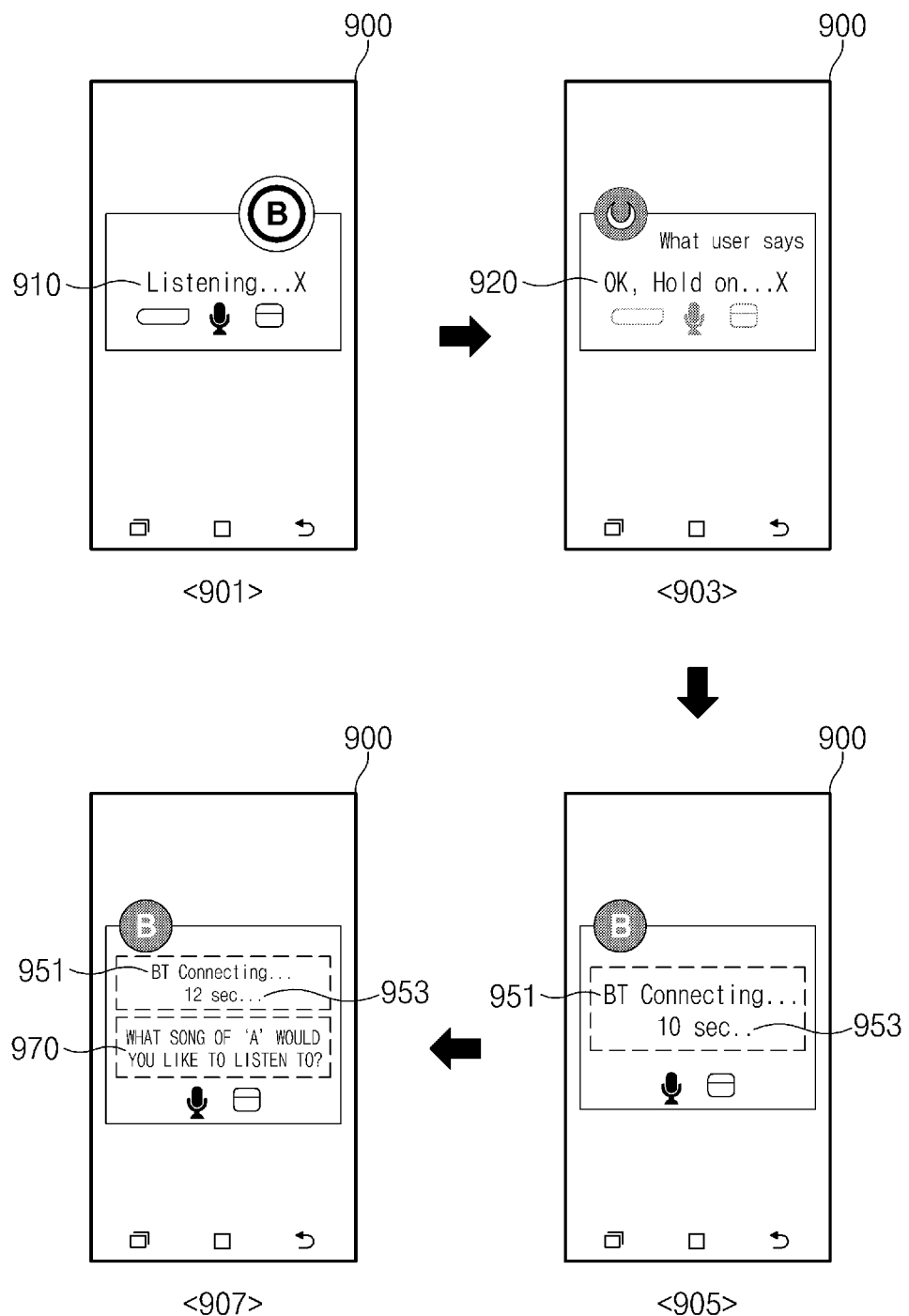
FIG. 9 is a view for describing a method of performing a task, which requires a user input, from among other tasks associated with a delayed task, according to an embodiment of the present disclosure.

FIG. 9 is a view for describing a method of performing a task, which requires a user input, from among other tasks associated with a delayed task, according to an embodiment of the present disclosure.

Referring to FIG. 9, an electronic device (e.g., the electronic device 600) may launch an intelligence app such as a speech recognition app stored in a memory (e.g., the memory 670). In this case, an electronic device may display the UI of the intelligence app on a screen 900 of a display (e.g., the display 630). In addition, in a state where the UI of the intelligence app is displayed on the screen 900, if a user touches a voice input button included in the UI of the intelligence app for the purpose of entering a voice, the electronic device may enter a standby state for receiving a user's voice input and may receive the user's voice input through a microphone (e.g., the microphone 610) in the standby state. In this case, as illustrated in a first state 901, the electronic device may display a first object 910 for providing a notification that the user's voice input is being received ("Listening . . . "), on the screen 900. In any embodiment, the electronic device may include the first object 910 in the UI of the intelligence app and may output the first object 910 on the screen 900. In any embodiment, in the case where a hardware key (e.g., the hardware key 112) disposed on one surface of a housing is pressed and held, the electronic device may launch the intelligence app and may activate the microphone so as to receive the voice input.

If the user's voice input is completed, the electronic device according to an embodiment may transmit the voice data corresponding to the received voice input to an external electronic device (e.g., the intelligence server 200) through a communication circuit (e.g., the communication circuit 690). In this case, the external electronic device may convert the received voice data to text data, may determine a sequence of tasks including sequence information about tasks for performing the function of at least one app included in the memory of the electronic device, based on the converted text data, and may transmit the determined sequence of tasks to the electronic device. As illustrated in a second state 903, until receiving the sequence of tasks after transmitting the voice data, the electronic device according to an embodiment may display a second object 920 indicating that the electronic device is in a standby state for receiving the sequence of tasks ("OK, Hold on . . . "), on the screen 900. In any embodiment, the electronic device may include the second object 920 in the UI of the intelligence app and may output the second object 920 on the screen 900. For example, the electronic device may switch the first object 910 included in the UI of the intelligence app to the second object 920.

According to an embodiment, the electronic device may determine whether the delayed task, the execution of which is not completed within a specified time, from among tasks included in the received sequence of tasks is present. In this case, as illustrated in a third state 905, the electronic device may output state information about the delayed task on the screen 900. For example, the electronic device may output a third object 951 indicating a type of the delayed task and a fourth object 953 indicating the execution time of the delayed task (BT Connecting . . . 10 sec . . . ), on the screen 900. In an embodiment, the electronic device may include the third object 951 and the fourth object 953 in the UI of the intelligence app and may output the third object 951 and the fourth object 953 on the screen 900. For example, the electronic device may switch the second object 920 included in the UI of the intelligence app to the third object 951 and the fourth object 953.

According to an embodiment, as illustrated in the third state 905, the electronic device may extend the time-out time of the delayed task. In this case, as illustrated in a fourth state 907, the electronic device may output state information about the delayed task on the screen 900. For example, the electronic device may output the third object 951 indicating a type of the delayed task and the fourth object 953 indicating the execution time of the delayed task, on the screen 900. That is, an electronic device according to an embodiment may continuously output the third object 951 and the fourth object 953, which are output in the third state 905, in the fourth state 907. However, the time elapsed with the passage of time may be applied to the fourth object 953 that is output in the fourth state 907.

For example, the electronic device 900 may perform the task of connecting the Bluetooth headset in the background while executing the task of retrieving desired media in the foreground.

According to an embodiment, in the third state 905, the electronic device may determine whether a task, which requires a user input, from among other tasks other than the delayed task is present. For example, the electronic device may determine whether a task, in which necessary parameter information is absent, from among tasks included in the sequence of tasks is present. In the case where there is a task not including parameter information even though the task requires the parameter information, the electronic device may output the user interface associated with the parameter information on the screen 900 for the purpose of obtaining the parameter information. In any embodiment, as illustrated in the fourth state 907, the electronic device may display a fifth object 970 for determining whether the user interface is output, on the screen 900.

Figure 10:
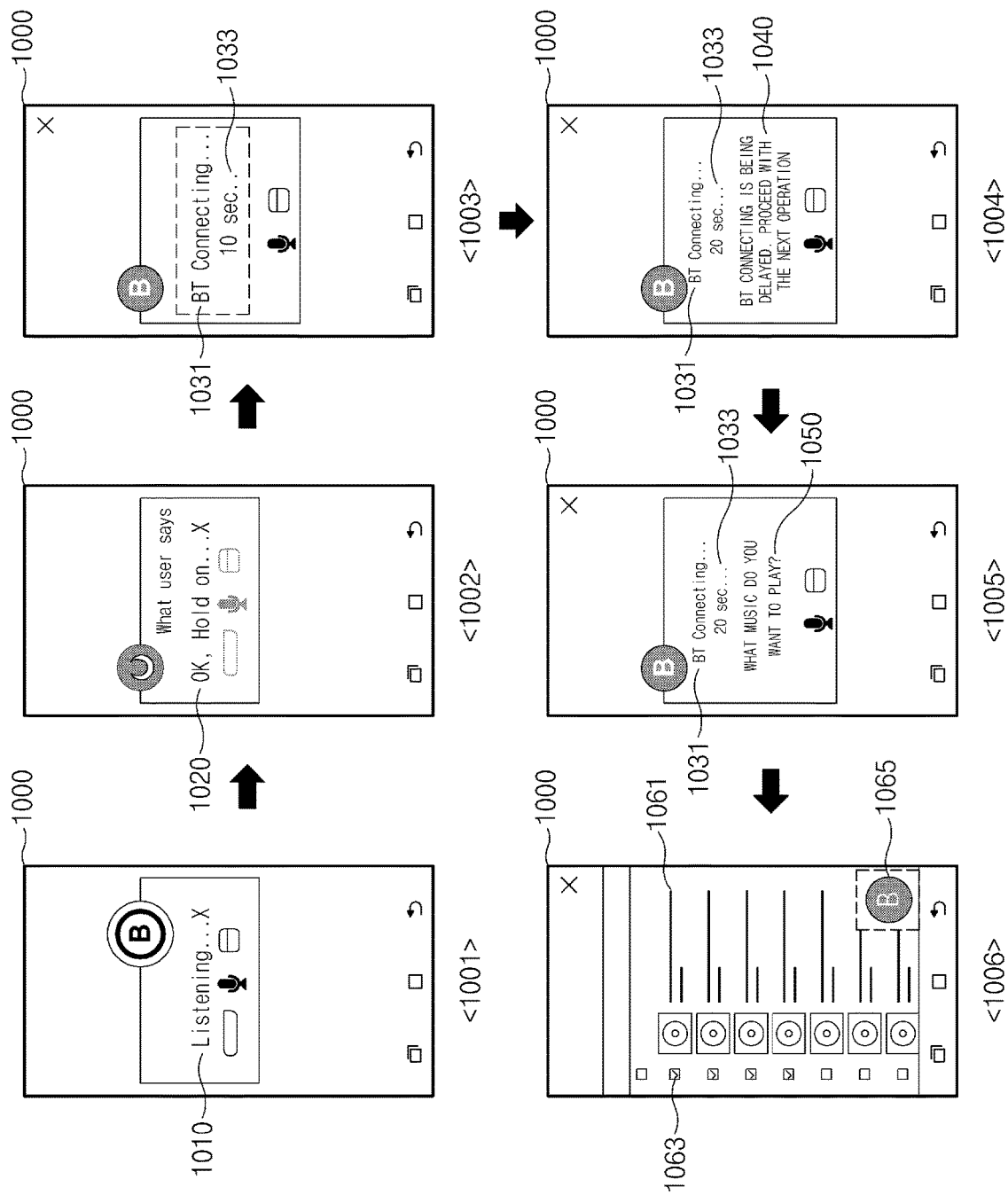
FIG. 10 is a view for describing another method of performing a task, which requires a user input, from among other tasks associated with a delayed task, according to an embodiment of the present disclosure.

FIG. 10 is a view for describing another method of performing a task, which requires a user input, from among other tasks associated with a delayed task, according to an embodiment of the present disclosure.

According to an embodiment, in the case where a task, which requires a user input, from among other tasks associated with the delayed task is present, the electronic device (e.g., the electronic device 600) may proceed to a procedure to receive the user input. For example, the electronic device may output a user interface associated with the parameter information on a screen 1000 of a display (e.g., the display 630) for the purpose of obtaining parameter information necessary to perform the task. In this case, the user interface may be differently organized depending on a type of the parameter information and may be output on the screen 1000.

Referring to FIG. 10, an electronic device according to an embodiment may launch an intelligence app such as a speech recognition app stored in a memory (e.g., the memory 670). In this case, the electronic device may display the UI of the intelligence app on the screen 1000. In addition, in a state where the UI of the intelligence app is displayed on the screen 1000, if a user touches a voice input button included in the UI of the intelligence app for the purpose of entering a voice, the electronic device may enter a standby state for receiving a user's voice input and may receive the user's voice input through a microphone (e.g., the microphone 610) in the standby state. In this case, as illustrated in a first state 1001, the electronic device may display a first object 1010 for providing a notification that the user's voice input is being received, on the screen 1000.

In any embodiment, in the case where a hardware key (e.g., the hardware key 112) disposed on one surface of a housing is pressed and held, the electronic device may launch the intelligence app and may activate the microphone so as to receive the voice input.

If the user's voice input is completed, the electronic device according to an embodiment may transmit the voice data corresponding to the received voice input to an external electronic device (e.g., the intelligence server 200) through a communication circuit (e.g., the communication circuit 690). In this case, the external electronic device may convert the received voice data to text data, may determine a sequence of tasks including sequence information about tasks for performing the function of at least one app included in the memory of the electronic device, based on the converted text data, and may transmit the determined sequence of tasks to the electronic device. As illustrated in a second state 1002, until receiving the sequence of tasks after transmitting the voice data, the electronic device according to an embodiment may display a second object 1020 indicating that the electronic device is in a standby state for receiving the sequence of tasks, on the screen 1000.

According to an embodiment, the electronic device may determine whether the delayed task, the execution of which is not completed within a specified time, from among tasks included in the received sequence of tasks is present. In this case, as illustrated in a third state 1003, the electronic device may output state information about the delayed task on the screen 1000. For example, the electronic device may output a third object 1031 indicating a type of the delayed task and the fourth object 1033 indicating the execution time of the delayed task, on the screen 1000.

According to an embodiment, as illustrated in the third state 1003, the electronic device may extend the time-out time of the delayed task. In this case, as illustrated in a fourth state 1004, the electronic device may output state information about the delayed task on the screen 1000. For example, the electronic device may output a third object 1031 indicating a type of the delayed task and the fourth object 1033 indicating the execution time of the delayed task, on the screen 1000. That is, an electronic device according to an embodiment may continuously output the third object 1031 and the fourth object 1033, which are output in the third state 1003, in the fourth state 1004. However, the time elapsed with the passage of time may be applied to the fourth object 1033 that is output in the fourth state 1004.

According to an embodiment, if the execution of the delayed task is not completed within the extended time-out time, in a fourth state 1004, the electronic device may output a fifth object 1040 for providing a notification that the execution is not completed within the extended time-out time, on the screen 1000. Furthermore, the electronic device may determine whether a task, which requires a user input, from among other tasks other than the delayed task is present. For example, the electronic device may determine whether a task, in which necessary parameter information is absent, from among tasks included in the sequence of tasks is present. In the case where there is a task not including parameter information even though the task requires the parameter information, the electronic device may output the user interface associated with the parameter information on the screen 1000 for the purpose of obtaining the parameter information. In any embodiment, as illustrated in the fifth state 1005, the electronic device may display a sixth object 1050 for determining whether the user interface is output, on the screen 1000.

For example, the electronic device 1000 may perform the task of connecting the Bluetooth headset in the background while executing the task of retrieving desired media in the foreground.

According to an embodiment, the electronic device may differently organize the user interface depending on a type of parameter information to be obtained. For example, in FIG. 9, the user's voice may be uttered as "play song A by using a BT headset"; the connection to the BT headset, the search for song A, and playback the selected song A may be set to a first task, a second task, and a third task, respectively; parameter information about "song A" may be needed to perform the second task and the third task among the tasks. As such, the electronic device in FIG. 9 may provide a user interface that allows the user to select "song A". For example, the electronic device may output a list including only song files, in each of which artist information is "A", from among all song files stored in a memory on a screen. For another example, in FIG. 10, the user's voice may be uttered as "play music by using a BT headset"; the connection to the BT headset, the search for the music, and playback the selected song A may be set to a first task, a second task, and a third task, respectively; parameter information about the "music" may be needed to perform the second task and the third task among the tasks. As such, the electronic device in FIG. 10 may provide a user interface that allows the user to select the "music". For example, as illustrated in a sixth state 1006, the electronic device may output a list including all music files (or song files) stored in a memory, on the screen 1000. The list may include at least one item including information 1061 about each music file and a button 1063 (e.g., check box) that allows the user to select each music file.

According to an embodiment, as illustrated in the sixth state 1006, the electronic device may display an object 1065 for providing a notification of the presence of the delayed task, on the screen 1000.

Figure 11:
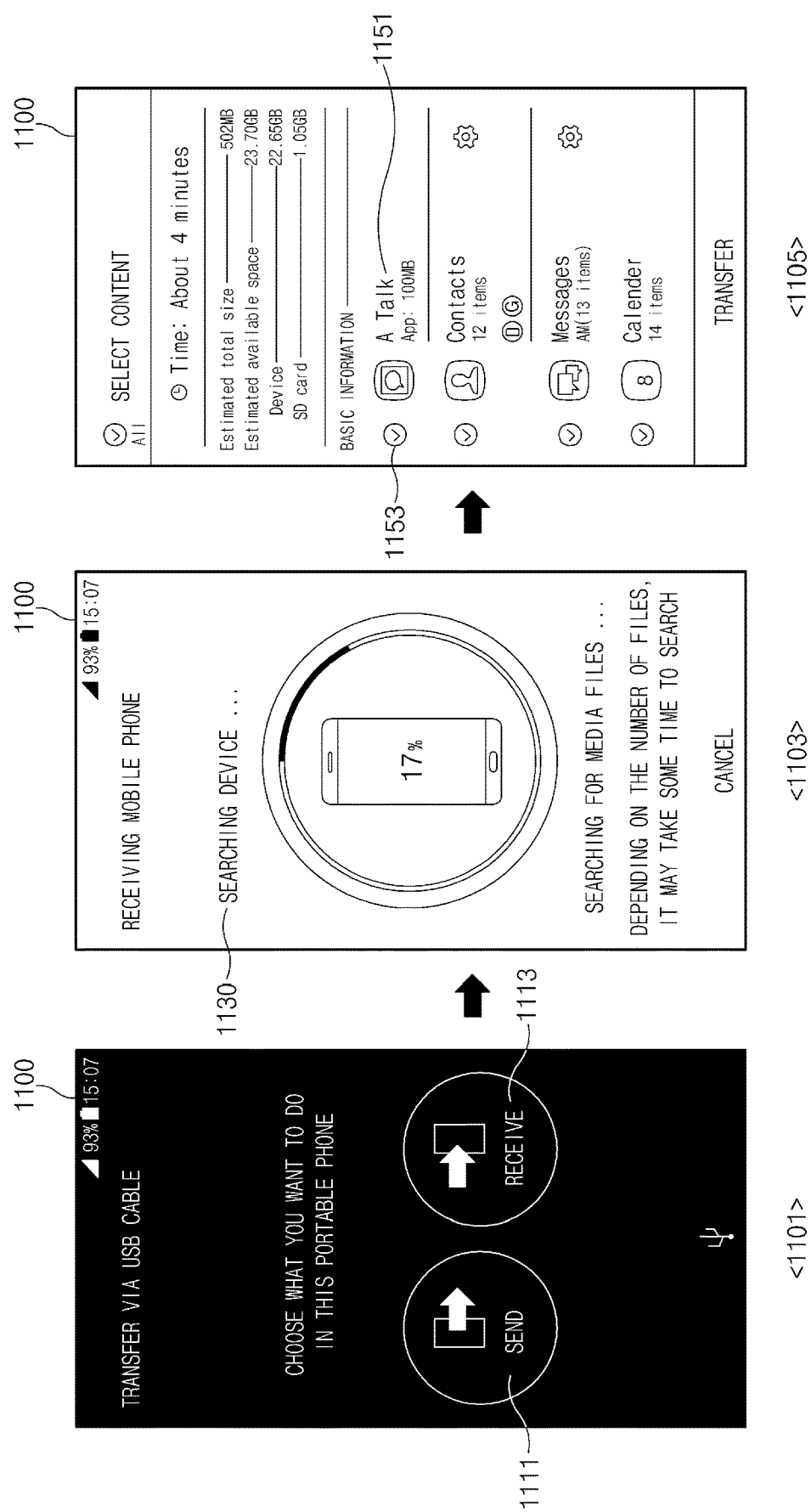
FIG. 11 is a view for describing another method of performing a task, which requires a user input, from among other tasks associated with a delayed task, according to an embodiment of the present disclosure.

FIG. 11 is a view for describing another method of performing a task, which requires a user input, from among other tasks associated with a delayed task, according to an embodiment of the present disclosure.

Referring to FIG. 11, in the case where a task, which requires a user input, from among other tasks associated with the delayed task is present, the electronic device (e.g., the electronic device 600) according to an embodiment may perform tasks to be performed after the delayed task, based on a separate sequence of tasks. For example, if receiving a sequence of tasks for performing the function of an app supporting data transmitting/receiving between electronic devices, such as a smart switch app or the like from the intelligence server 200, the electronic device may receive a separate sequence of tasks from the intelligence server 200 and may process tasks, which are to be executed after the delayed task, among tasks included in the sequence of tasks, based on the separate sequence of tasks.

According to an embodiment, in a first state 1101, the electronic device may output a first execution screen of a smart switch app on a screen 1100 of a display (e.g., the display 630); if a send button 1111 or a receive button 1113 included in the first execution screen is selected by a user's touch input, the electronic device may search for data to be transmitted or received. In this case, as illustrated in a second state 1103, the electronic device may display an object 1130 for providing a notification that data is being found, on the screen 1100.

According to an embodiment, in a second state 1103, if the execution of a task corresponding to the search of data is not completed within a specified time, the electronic device may perform tasks after the data is found (i.e., a task to receive a user input to select data to be transmitted or received, from the found data, a task to transmit or receive the selected data, and the like) based on the separate sequence of tasks. The separate sequence of tasks may be received from the intelligence server 200, and a point in time when the separate sequence of tasks is received may be different depending on the context such as a point in time when a user first makes a speech, a point in time when the delayed task is performed in background, or the like.

Afterwards, if the search of data to be transmitted or received is completed, as in a third state 1105, the electronic device may output a list including information 1151 about a type of each found data, a button 1153 that allows each data to be selected, and the like, on the screen 1100.

Figure 12:
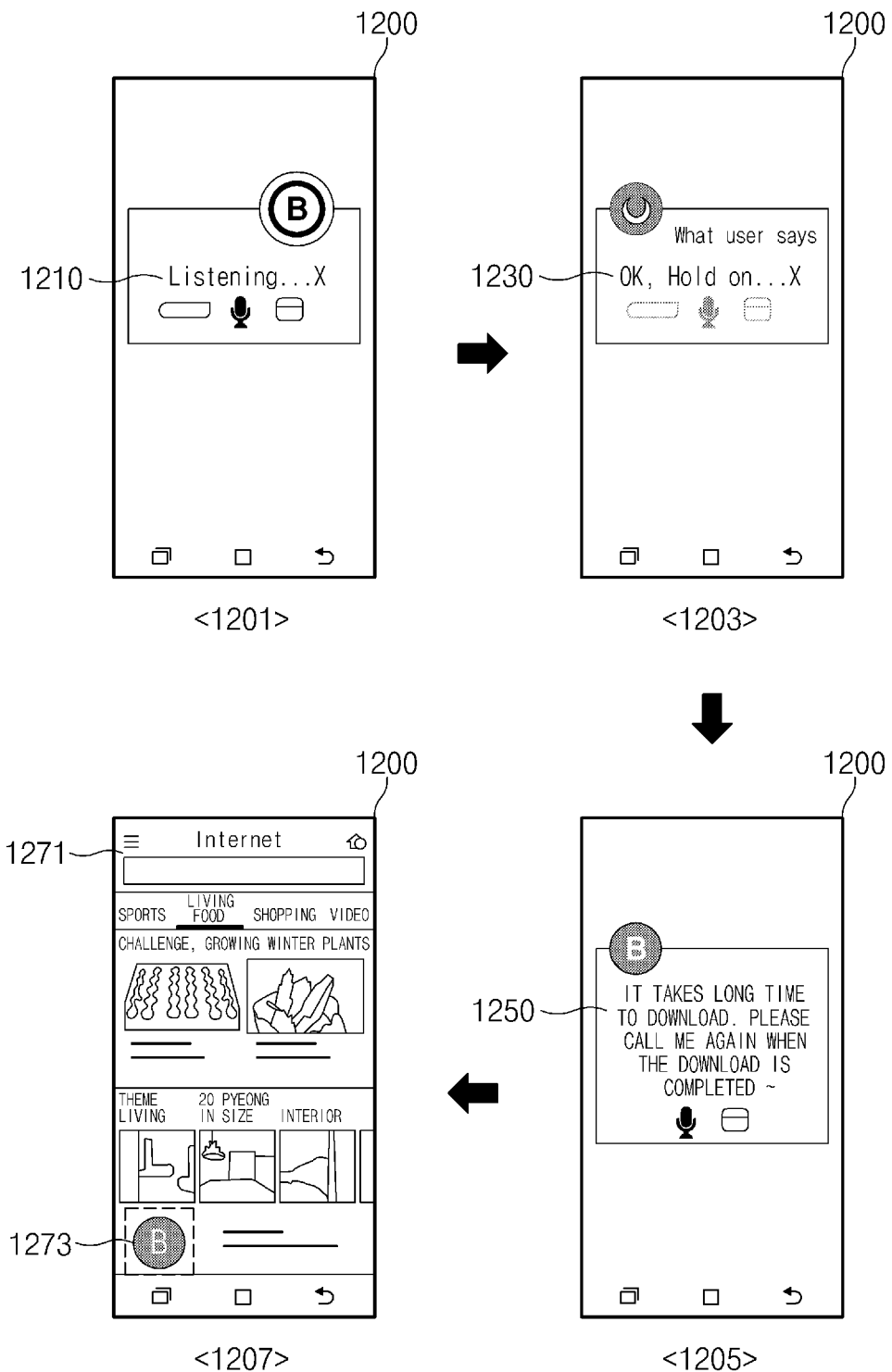
FIG. 12 is a view for describing a method of outputting an object for providing a notification of the presence of a delayed task, according to an embodiment of the present disclosure.

FIG. 12 is a view for describing a method of outputting an object for providing a notification of the presence of a delayed task, according to an embodiment of the present disclosure.

According to an embodiment, in the case where the delayed task is present, an electronic device (e.g., the electronic device 600) may switch the execution of the delayed task to the execution in background while extending the time-out time of the delayed task. At this time, the electronic device may output an object for providing a notification of the presence of the delayed task, on a screen 1200 of a display (e.g., the display 630).

Referring to FIG. 12, an electronic device may launch an intelligence app such as a speech recognition app stored in a memory (e.g., the memory 670). In this case, the electronic device may display the UI of the intelligence app on the screen 1200. In addition, in a state where the UI of the intelligence app is displayed on the screen 1200, if a user touches a voice input button included in the UI of the intelligence app for the purpose of entering a voice, the electronic device may enter a standby state for receiving a user's voice input and may receive the user's voice input through a microphone (e.g., the microphone 610) in the standby state. In this case, as illustrated in a first state 1201, the electronic device may display a first object 1210 for providing a notification that the user's voice input is being received, on the screen 1200. In any embodiment, in the case where a hardware key (e.g., the hardware key 112) disposed on one surface of a housing is pressed and held, the electronic device may launch the intelligence app and may activate the microphone so as to receive the voice input.

If the user's voice input is completed, the electronic device according to an embodiment may transmit the voice data corresponding to the received voice input to an external electronic device (e.g., the intelligence server 200) through a communication circuit (e.g., the communication circuit 690). In this case, the external electronic device may convert the received voice data to text data, may determine a sequence of tasks including sequence information about tasks for performing the function of at least one app included in the memory of the electronic device, based on the converted text data, and may transmit the determined sequence of tasks to the electronic device. As illustrated in a second state 1203, until receiving the sequence of tasks after transmitting the voice data, the electronic device according to an embodiment may display a second object 1230 indicating that the electronic device is in a standby state for receiving the sequence of tasks, on the screen 1200.

According to an embodiment, in the case where the delayed task, the execution of which is not completed within a specified time, from among tasks included in the received sequence of tasks is present, as illustrated in a third state 1205, the electronic device may output state information about the delayed task on the screen 1200. For example, the electronic device may output a third object 1250 indicating a type of the delayed task on the screen 1200. In any embodiment, the third object 1250 may further include content for providing a notification that the size of an object (e.g., the third object 1250) for providing a notification of the execution time of the delayed task or the presence of the delayed task is capable of being minimized.

According to an embodiment, if a specific time elapses after the third state 1205, as illustrated in a fourth state 1207, the electronic device may display an object (e.g., the third object 1250) for providing a notification of the presence of the delayed task, in a partial area of the screen 1200. For example, the electronic device may display a fourth object 1273, the size of which is minimized. In this case, the electronic device may allow the fourth object 1273 to partly overlap only the function execution screen 1271 of another app installed in a memory.

According to an embodiment, if a user input to touch the fourth object 1273 occurs, the electronic device may output state information about the delayed task on the screen 1200. For example, in the case where the execution of the delayed task is completed, the electronic device may output the execution completion result of the delayed task on the screen 1200.

Figure 13:
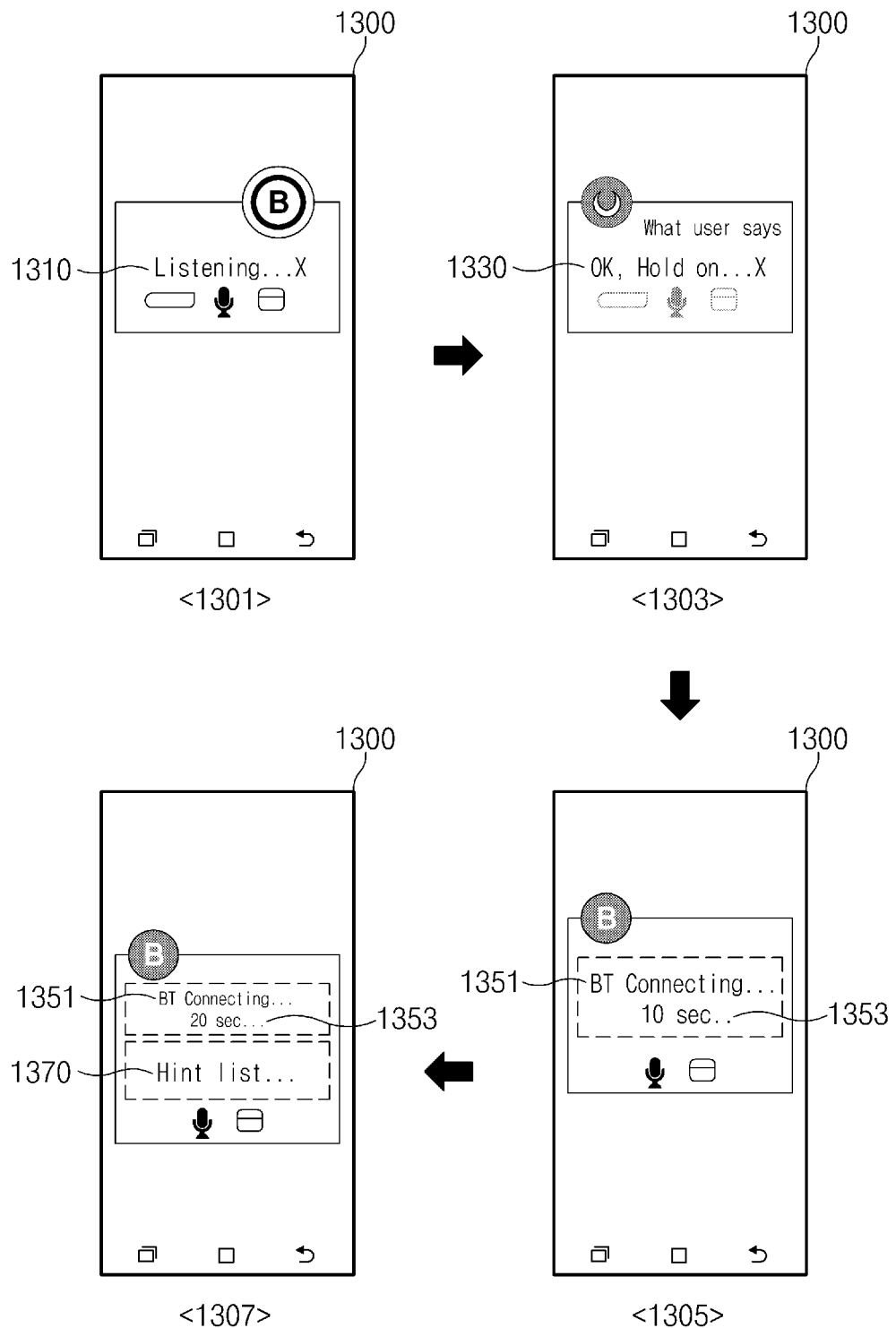
FIG. 13 is a view for describing a method of performing another task associated with a delayed task, according to an embodiment of the present disclosure.

FIG. 13 is a view for describing a method of performing another task associated with a delayed task, according to an embodiment of the present disclosure.

According to an embodiment, in the case where it takes a long time to perform a part of tasks included in a sequence of tasks, the processor (e.g., the processor 650) of an electronic device (e.g., the electronic device 600) may provide a user with a hint. For example, the hint may include an object corresponding to an operation in which the user is capable of performing an additional input. For example, the hint may be an example of a user input to be provided to the user for the purpose of obtaining parameter information.

Referring to FIG. 13, an electronic device may launch an intelligence app such as a speech recognition app stored in a memory (e.g., the memory 670). In this case, the electronic device may display the UI of the intelligence app on a screen 1300. In addition, in a state where the UI of the intelligence app is displayed on the screen 1300, if a user touches a voice input button included in the UI of the intelligence app for the purpose of entering a voice, the electronic device may enter a standby state for receiving a user's voice input and may receive the user's voice input through a microphone (e.g., the microphone 610) in the standby state. In this case, as illustrated in a first state 1301, the electronic device may display a first object 1310 for providing a notification that the user's voice input is being received, on the screen 1300. In any embodiment, in the case where a hardware key (e.g., the hardware key 112) disposed on one surface of a housing is pressed and held, the electronic device may launch the intelligence app and may activate the microphone so as to receive the voice input.

If the user's voice input is completed, the electronic device according to an embodiment may transmit the voice data corresponding to the received voice input to an external electronic device (e.g., the intelligence server 200) through a communication circuit (e.g., the communication circuit 690). In this case, the external electronic device may convert the received voice data to text data, may determine a sequence of tasks including sequence information about tasks for performing the function of at least one app included in the memory of the electronic device, based on the converted text data, and may transmit the determined sequence of tasks to the electronic device. As illustrated in a second state 1303, until receiving the sequence of tasks after transmitting the voice data, the electronic device according to an embodiment may display a second object 1330 indicating that the electronic device is in a standby state for receiving the sequence of tasks, on the screen 1300.

According to an embodiment, in the case where the delayed task, the execution of which is not completed within a specified time, from among tasks included in the received sequence of tasks is present, as illustrated in a third state 1305, the electronic device may output state information about the delayed task on the screen 1300. For example, the electronic device may output a third object 1351 indicating a type of the delayed task and the fourth object 1353 indicating the execution time of the delayed task, on the screen 1300.

According to an embodiment, in a third state 1305, the electronic device may determine a hint to be provided to a user. For example, in the case where a task, which requires the parameter information, from among other tasks other than the delayed task is present, the electronic device may determine the hint to be provided to a user for the purpose of obtaining the parameter information. In this regard, an intelligence agent (e.g., the intelligence agent 151) included in the processor may transmit a hint provision request to a suggestion module (e.g., the proposal module 155*c*) included in the processor. If receiving the hint provision request from the intelligence agent, a hint provider in the suggestion module may receive the request and may request a contextual hint generator to generate a hint. The contextual hint generator may receive information from a context module (e.g., the context module 155*a*) or a persona module (e.g., the persona module 155*b*) by using a condition checker. The contextual hint generator may set a condition model in the suggestion module by using the received information and may verify the condition module to generate a hint matched to context. If the generated hint is transmitted to a hint provider, the hint provider may sort hints to be showed to the user according to internal rules and may display selected hints.

According to an embodiment, if the hint to be provided to the user is determined, as illustrated in a fourth state 1307, the electronic device may output a fifth object 1370 indicating the determined hint on the screen 1300. For example, an object (e.g., a UI for searching for another device) corresponding to an operation in which the user is capable of performing an additional input may be displayed in the fifth object 1370.

Figure 14:
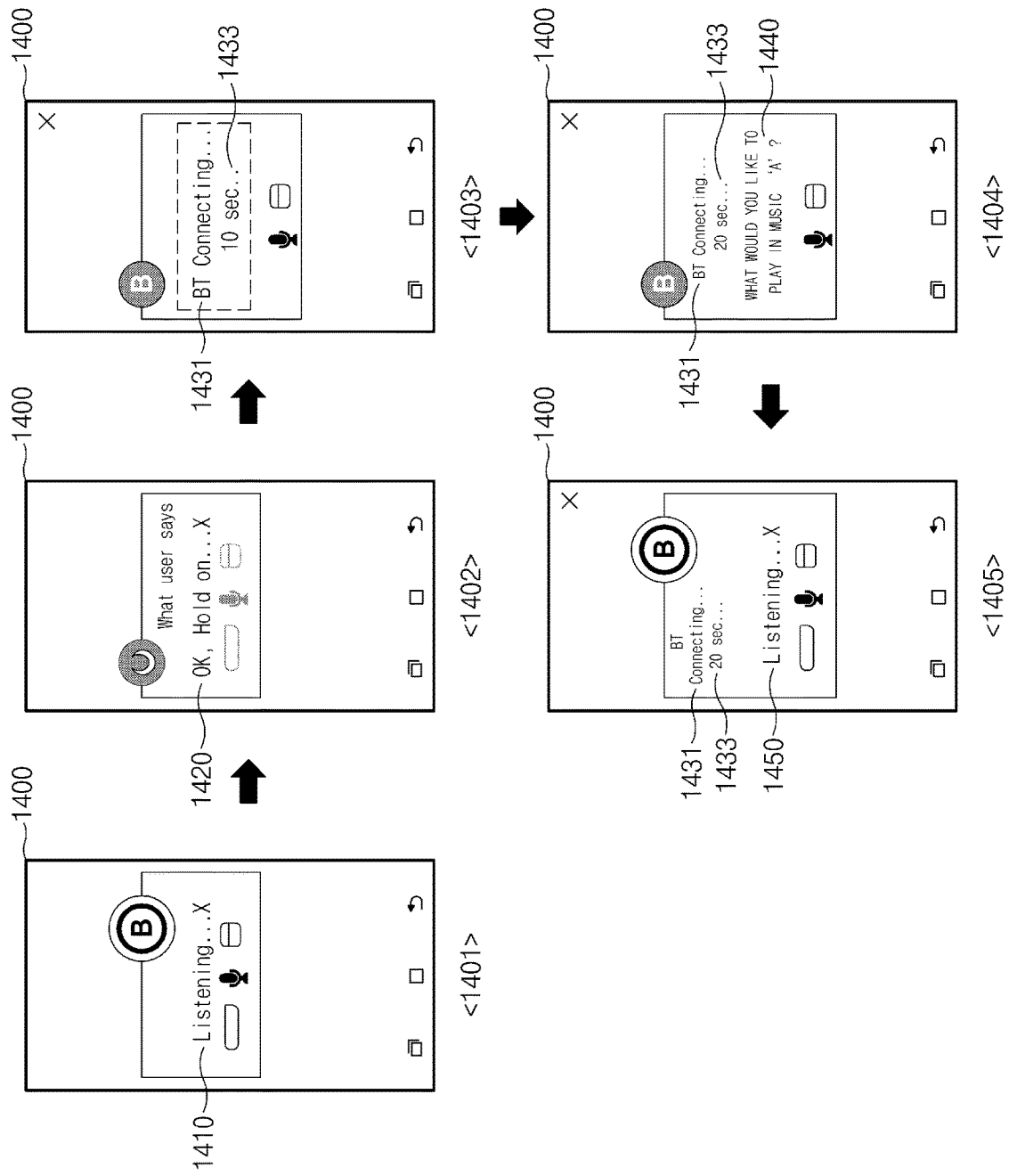
FIG. 14 is a view for describing a method of performing a task, which requires a user's voice input, from among other tasks associated with a delayed task, according to an embodiment of the present disclosure.

FIG. 14 is a view for describing a method of performing a task, which requires a user's voice input, from among other tasks associated with a delayed task, according to an embodiment of the present disclosure.

According to an embodiment, in the case where a task, which requires a user input, from among other tasks associated with the delayed task is present, the electronic device (e.g., the electronic device 600) may proceed to a procedure to receive the user input. For example, the electronic device may output a user interface associated with the parameter information on a screen 1400 of a display (e.g., the display 630) for the purpose of obtaining parameter information necessary to perform the task. In any embodiment, the electronic device may receive a user input by using a voice input. In this case, the electronic device may request a user to enter the parameter information by using a voice and may activate a microphone (e.g., the microphone 610) to receive the user's voice input.

Referring to FIG. 14, an electronic device may launch an intelligence app such as a speech recognition app stored in a memory (e.g., the memory 670). In this case, the electronic device may display the UI of the intelligence app on the screen 1400. In addition, in a state where the UI of the intelligence app is displayed on the screen 1400, if a user touches a voice input button included in the UI of the intelligence app for the purpose of entering a voice, the electronic device may enter a standby state for receiving a user's voice input and may receive the user's voice input through a microphone in the standby state. In this case, as illustrated in a first state 1401, the electronic device may display a first object 1410 for providing a notification that the user's voice input is being received, on the screen 1400. In any embodiment, in the case where a hardware key (e.g., the hardware key 112) disposed on one surface of a housing is pressed and held, the electronic device may launch the intelligence app and may activate the microphone so as to receive the voice input.

If the user's voice input is completed, the electronic device according to an embodiment may transmit the voice data corresponding to the received voice input to an external electronic device (e.g., the intelligence server 200) through a communication circuit (e.g., the communication circuit 690). In this case, the external electronic device may convert the received voice data to text data, may determine a sequence of tasks including sequence information about tasks for performing the function of at least one app included in the memory of the electronic device, based on the converted text data, and may transmit the determined sequence of tasks to the electronic device. As illustrated in a second state 1402, until receiving the sequence of tasks after transmitting the voice data, the electronic device according to an embodiment may display a second object 1420 indicating that the electronic device is in a standby state for receiving the sequence of tasks, on the screen 1400.

According to an embodiment, in the case where the delayed task, the execution of which is not completed within a specified time, from among tasks included in the received sequence of tasks is present, as illustrated in a third state 1403, the electronic device may output state information about the delayed task on the screen 1400. For example, the electronic device may output a third object 1431 indicating a type of the delayed task and the fourth object 1433 indicating the execution time of the delayed task, on the screen 1400.

According to an embodiment, in the case where the execution of the delayed task is not completed within the extended time-out time even though having extended the time-out time of the delayed task, the electronic device may determine whether a task, which requires parameter information, from among other tasks other than the delayed task is present. In the case where another task requiring the parameter information is present, as illustrated in a fourth state 1404, the electronic device may output a fifth object 1440, which allows the user to speak a voice associated with the parameter information, on the screen 1400 for the purpose of obtaining the parameter information. In any embodiment, before extending the time-out time of the delayed task, the electronic device may determine whether a task, which requires the parameter information, from among other tasks other than the delayed task is present; in the case where another task requiring the parameter information is present, the electronic device may output the fifth object 1440 on the screen 1400. Furthermore, the electronic device may activate the microphone for the purpose of receiving the user's voice. In this case, the electronic device may receive the user's voice input associated with the parameter information through the microphone; as illustrated in a first state 1405, the electronic device may display a sixth object 1450 for providing a notification that the user's voice input is being received, on the screen 1400.

Figure 15:
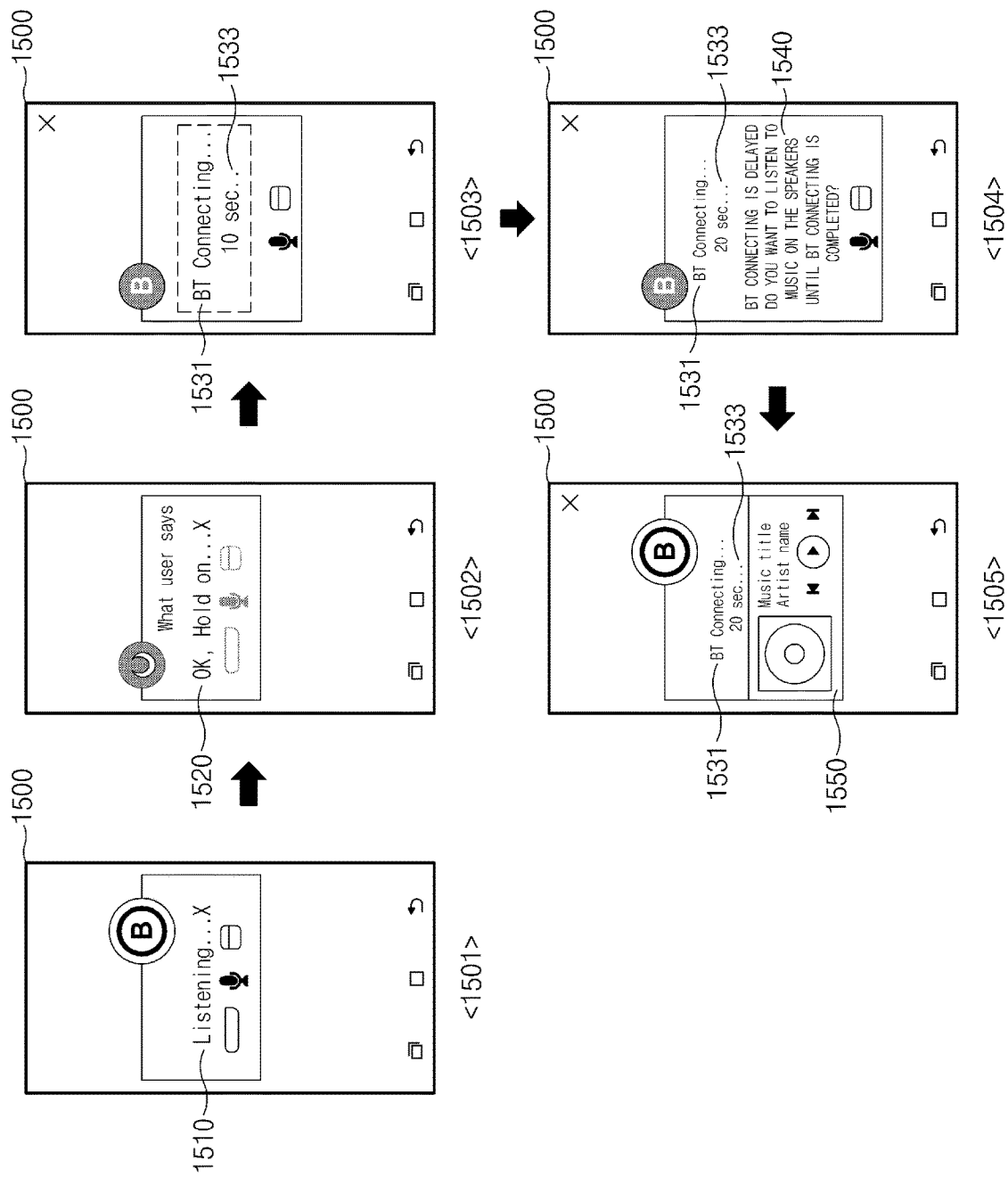
FIG. 15 is a view for describing a method to suggest a function similar to a delayed task, according to an embodiment.

FIG. 15 is a view for describing a method to suggest a function similar to a delayed task, according to an embodiment.

Referring to FIG. 15, while performing the delayed task in background, an electronic device (e.g., the electronic device 600) may perform a function similar to the delayed task or may suggest the execution of the similar function to a user. For example, in the case where the delayed task is performed as a stage for performing a first function, while performing the delayed task in background, the electronic device may perform a second function similar to the first function.

The electronic device may launch an intelligence app such as a speech recognition app stored in a memory (e.g., the memory 670). In this case, the electronic device may display the UI of the intelligence app on the screen 1500. In addition, in a state where the UI of the intelligence app is displayed on the screen 1500, if a user touches a voice input button included in the UI of the intelligence app for the purpose of entering a voice, the electronic device may enter a standby state for receiving a user's voice input and may receive the user's voice input through a microphone in the standby state. In this case, as illustrated in a first state 1501, the electronic device may display a first object 1510 for providing a notification that the user's voice input is being received, on the screen 1500. In any embodiment, in the case where a hardware key (e.g., the hardware key 112) disposed on one surface of a housing is pressed and held, the electronic device may launch the intelligence app and may activate the microphone so as to receive the voice input.

If the user's voice input is completed, the electronic device according to an embodiment may transmit the voice data corresponding to the received voice input to an external electronic device (e.g., the intelligence server 200) through a communication circuit (e.g., the communication circuit 690). In this case, the external electronic device may convert the received voice data to text data, may determine a sequence of tasks including sequence information about tasks for performing the function of at least one app included in the memory of the electronic device, based on the converted text data, and may transmit the determined sequence of tasks to the electronic device. As illustrated in a second state 1502, until receiving the sequence of tasks after transmitting the voice data, the electronic device according to an embodiment may display a second object 1520 indicating that the electronic device is in a standby state for receiving the sequence of tasks, on the screen 1500.

According to an embodiment, in the case where the delayed task, the execution of which is not completed within a specified time, from among tasks included in the received sequence of tasks is present, as illustrated in a third state 1503, the electronic device may output state information about the delayed task on the screen 1500. For example, the electronic device may output a third object 1531 indicating a type of the delayed task and the fourth object 1533 indicating the execution time of the delayed task, on the screen 1500.

According to an embodiment, in the case where the execution of the delayed task is not completed within the extended time-out time even though having extended the time-out time of the delayed task, the electronic device may suggest a function (e.g., second function) similar to a function (e.g., first function) to be performed by the delayed task, to the user. For example, as illustrated in a fourth state 1504, the electronic device may output a fifth object 1540 indicating the content suggesting the execution of the second function, on the screen 1500. For example, in the case where the first function is a function to output a sound through a first output path (e.g., Bluetooth headphone), the electronic device may suggest the execution of the second function to output a sound through a second output path (e.g., speaker), to the user. In any embodiment, before extending the time-out time of the delayed task, the electronic device may suggest the execution of the second function to the user. In any embodiment, while extending the time-out time of the delayed task, before completing the execution of the delayed task, the electronic device may suggest that the user should perform the second function similar to the first function to be performed by the delayed task. For example, before the Bluetooth headphone is connected, the electronic device may suggest to the user whether to listen to music through a speaker. In this case, if the Bluetooth headphone is connected, the electronic device may notify a user that the connection to the Bluetooth headphone is completed, and may output the music, which is output through the speaker, to the Bluetooth headphone. For another example, in the case where the delayed task is present, the electronic device may suggest the execution of the similar second function to the user, instead of the first function to be performed by the delayed task. For example, in the case where the connection to the Bluetooth headphone is delayed, the electronic device may suggest to the user to listen to the music through the speaker instead of the Bluetooth headphone.

According to an embodiment, if a user input to accept the execution of the second function is received, as illustrated in a fifth state 1505, the electronic device may perform the second function. For example, the electronic device may output a sixth object 1550 associated with the execution of the second function, on the screen 1500.

According to an embodiment, if the execution of the delayed task is completed during the execution of the second function, the electronic device may terminate the output of the sixth object 1550 associated with the execution of the second function and may output the execution completion result of the delayed task on the screen 1500.

Figure 16:
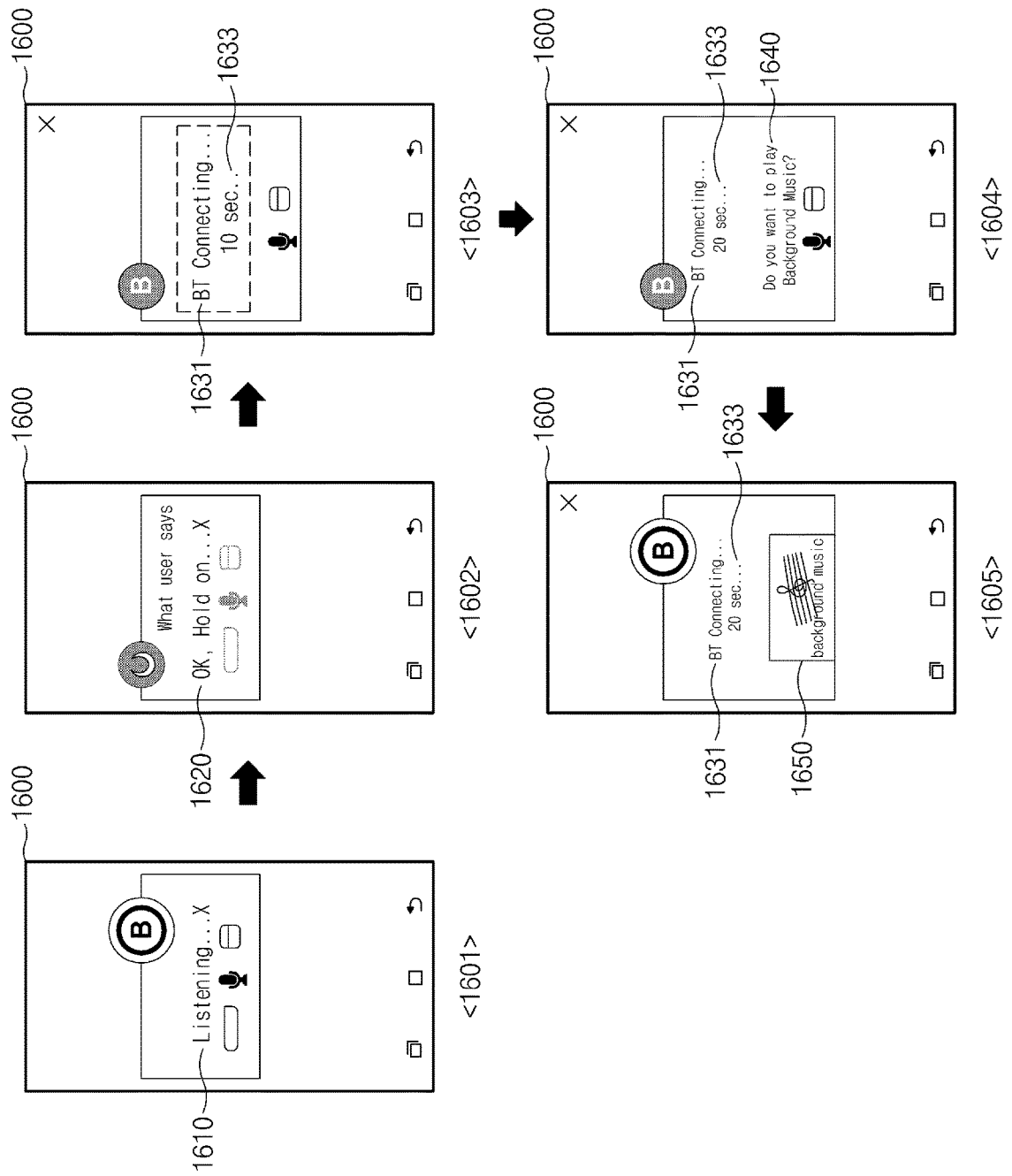
FIG. 16 is a view for describing another method to suggest a function similar to a delayed task, according to an embodiment.

FIG. 16 is a view for describing another method to suggest a function similar to a delayed task, according to an embodiment.

Referring to FIG. 16, while performing the delayed task in background, an electronic device (e.g., the electronic device 600) may perform a function similar to the delayed task or may suggest the execution of the similar function to a user. For example, in the case where the delayed task is performed as a stage for performing a first function, while performing the delayed task in background, the electronic device may perform a second function similar to the first function.

The electronic device may launch an intelligence app such as a speech recognition app stored in a memory (e.g., the memory 670). In this case, the electronic device may display the UI of the intelligence app on the screen 1600. In addition, in a state where the UI of the intelligence app is displayed on the screen 1600, if a user touches a voice input button included in the UI of the intelligence app for the purpose of entering a voice, the electronic device may enter a standby state for receiving a user's voice input and may receive the user's voice input through a microphone in the standby state. In this case, as illustrated in a first state 1601, the electronic device may display a first object 1610 for providing a notification that the user's voice input is being received, on the screen 1600. In any embodiment, in the case where a hardware key (e.g., the hardware key 112) disposed on one surface of a housing is pressed and held, the electronic device may launch the intelligence app and may activate the microphone so as to receive the voice input.

If the user's voice input is completed, the electronic device according to an embodiment may transmit the voice data corresponding to the received voice input to an external electronic device (e.g., the intelligence server 200) through a communication circuit (e.g., the communication circuit 690). In this case, the external electronic device may convert the received voice data to text data, may determine a sequence of tasks including sequence information about tasks for performing the function of at least one app included in the memory of the electronic device, based on the converted text data, and may transmit the determined sequence of tasks to the electronic device. As illustrated in a second state 1602, until receiving the sequence of tasks after transmitting the voice data, the electronic device according to an embodiment may display a second object 1620 indicating that the electronic device is in a standby state for receiving the sequence of tasks, on the screen 1600.

According to an embodiment, in the case where the delayed task, the execution of which is not completed within a specified time, from among tasks included in the received sequence of tasks is present, as illustrated in a third state 1603, the electronic device may output state information about the delayed task on the screen 1600. For example, the electronic device may output a third object 1631 indicating a type of the delayed task and the fourth object 1633 indicating the execution time of the delayed task, on the screen 1600.

According to an embodiment, the electronic device may suggest a function (e.g., second function) similar to a function (e.g., first function) to be performed by the delayed task, to the user. For example, as illustrated in a fourth state 1604, the electronic device may output a fifth object 1640 indicating the content suggesting the execution of the second function, on the screen 1600. For example, in the case where the first function is a function to output a sound through a first output path (e.g., Bluetooth headphone), the electronic device may suggest the execution of the second function to output a sound through a second output path (e.g., speaker), to the user. In this case, in the case where the sound (e.g., music) output through the second output path is not set, the electronic device may output the specified sound (e.g., background music) through the second output path.

According to an embodiment, if a user input to accept the execution of the second function is received, as illustrated in a fifth state 1605, the electronic device may perform the second function. For example, the electronic device may output a sixth object 1650 associated with the execution of the second function, on the screen 1600.

According to an embodiment, if the execution of the delayed task is completed during the execution of the second function, the electronic device may terminate the output of a sixth object 1650 associated with the execution of the second function and may output the execution completion result of the delayed task on the screen 1600.

Figure 17:
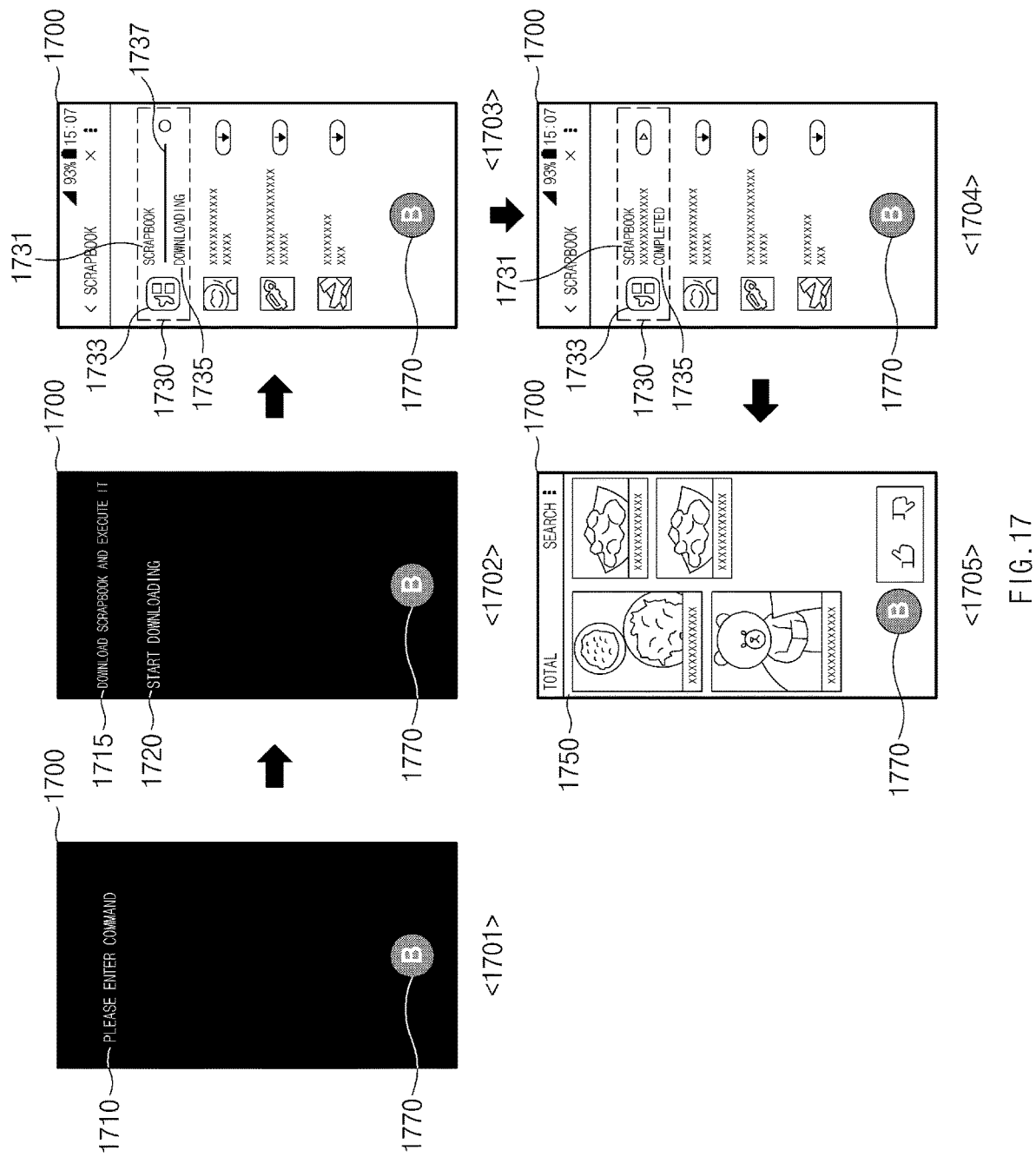
FIG. 17 is a view for describing a method of displaying a state of a delayed task, according to an embodiment of the present disclosure.

FIG. 17 is a view for describing a method of displaying a state of a delayed task, according to an embodiment of the present disclosure.

Referring to FIG. 17, an electronic device (e.g., the electronic device 600) may launch an intelligence app such as a speech recognition app stored in a memory (e.g., the memory 670). For example, in the case where a hardware key (e.g., the hardware key 112) disposed on one surface of a housing is pressed and held, the electronic device may launch the intelligence app. The electronic device may launch the intelligence app and may display the UI of the intelligence app on the screen 1700 of a display (e.g., the display 630). For example, the electronic device may output the UI of the intelligence app to the partial area (e.g., lower end area) of the screen 1700. For another example, as illustrated in a first state 1701, the electronic device may output the UI of the intelligence app to occupy most of the area of the screen 1700.

According to an embodiment, the electronic device may enter a standby state for receiving a user's voice input, and may activate a microphone so as to receive a voice input in the standby state. In this case, as illustrated in the first state 1701, the electronic device may display a first object 1710 indicating that the user's voice input is capable of being received, on the screen 1700.

According to an embodiment, if the user's voice input is completed through the activated microphone, the electronic device may transmit the voice data corresponding to the received voice input to an external electronic device (e.g., the intelligence server 200) through a communication circuit (e.g., the communication circuit 690). In this case, the external electronic device may convert the received voice data to text data, may determine a sequence of tasks including sequence information about tasks for performing the function of at least one app included in the memory of the electronic device, based on the converted text data, and may transmit the determined sequence of tasks to the electronic device. According to an embodiment, the external electronic device may transmit the converted text data to an electronic device; and, as illustrated in a second state 1702, the electronic device may display a second object 1715 including the received text data, on the screen 1700.

According to an embodiment, if receiving a sequence of tasks from the external electronic device, the electronic device may perform the tasks based on the sequence information of the tasks included in the sequence of tasks. In addition, as illustrated in the second state 1702, the electronic device may display a third object 1720 for providing a notification of the execution of the tasks, on the screen 1700.

According to an embodiment, in the case where the delayed task, the execution of which is not completed within a specified time, from among tasks included in the received sequence of tasks is present, the electronic device may extend the time-out time of the delayed task. In addition, in the case where the UI of the intelligence app is output while occupying most of the area of the screen 1700, the electronic device may minimize the UI of the intelligence app for the purpose of outputting state information (e.g., execution state information) about the delayed task on the screen 1700. For example, as illustrated in a third state 1703, the electronic device may terminate the output of the UI of the intelligence app, leaving only a specified icon 1770 (e.g., the icon of the intelligence app, or the like). In any embodiment, the electronic device may not output the specified icon 1770 in the first state 1701 and the second state 1702, and, as illustrated in the third state 1703, may output the specified icon 1770 in a procedure of minimizing the UI of the intelligence app.

According to an embodiment, if the UI of the intelligence app is minimized, the electronic device may display state information about the delayed task, for example, execution state information of the delayed task, on the screen 1700. For example, in the case where the delayed task includes an operation such as the download of specific data, as illustrated in a third state 1703, the electronic device may display a fourth object 1730 indicating an item corresponding to the specific data in the list of pieces of downloadable data. For example, the fourth object 1730 may include an identification name 1731 of the specific data, an identification image 1733 of the specific data, a download state 1735 of the specific data, download progress rate 1737 of the specific data, or the like.

According to an embodiment, if the execution of the delayed task is completed, the electronic device may display the execution completion result of the delayed task on the screen 1700. For example, as illustrated in a fourth state 1704, the electronic device may change the download state 1735 of the specific data to a completion state and may delete the download progress rate 1737 of the specific data. However, a method indicating the execution completion result of the delayed task is not limited thereto. In any embodiment, the electronic device may change the download progress rate 1737 of the specific data to information (e.g., 100%) corresponding to the completion state without deleting the download progress rate 1737 of the specific data.

According to an embodiment, in a state where the execution of the delayed task is completed and then the execution completion result of the delayed task is displayed on the screen 1700, if a specific time elapses, the electronic device may perform another task (e.g., displaying downloaded data) associated with the delayed task. Alternatively, as illustrated in a fifth state 1705, the electronic device may display the execution completion result of the other task on the screen 1700. For example, the electronic device may display the fifth object 1750 corresponding to the downloaded data on the screen 1700.

According to an embodiment, in a state where the execution state information of the delayed task is displayed on the screen 1700, if the screen 1700 is selected by a user's touch input, the electronic device may provide a user interface such that a user input is possible.

According to an embodiment, in a state where the execution state information of the delayed task is displayed on the screen 1700, if the specified icon 1770 is selected by the user's touch input, the electronic device may interrupt the execution of the delayed task. In this case, the electronic device may cancel the processing of a sequence of tasks including the delayed task.

Figure 18:
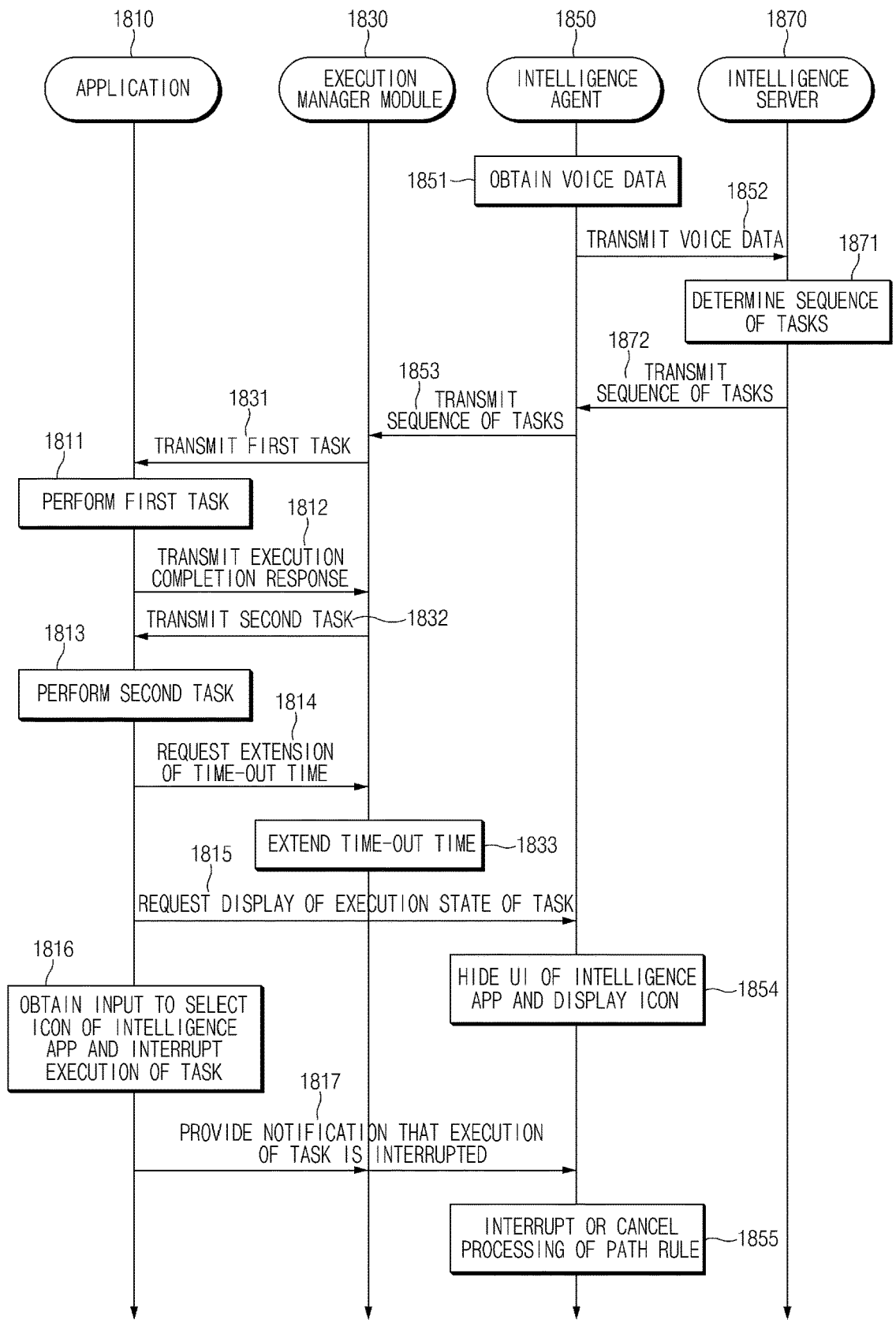
FIG. 18 is a view illustrating an operating method of an electronic device associated with a method of displaying a state of a delayed task, according to an embodiment of the present disclosure.

FIG. 18 is a view illustrating an operating method of an electronic device associated with a method of displaying a state of a delayed task, according to an embodiment of the present disclosure.

Referring to FIG. 18, an electronic device (e.g., the electronic device 600) may launch an intelligence app such as a speech recognition app stored in a memory (e.g., the memory 670). For example, the intelligence app may include instructions associated with an intelligence agent 1850 (e.g., the intelligence agent 151) and an execution manager module 1830 (e.g., execution manager module 153). The processor (e.g., the processor 650) of an electronic device may load instructions included in the intelligence app onto a memory and may execute the instructions so as to perform the functions of intelligence agent 1850 and execution manager module 1830.

According to an embodiment, in operation 1851, the intelligence agent 1850 may obtain voice data through a microphone (e.g., the microphone 610). In addition, in operation 1852, the intelligence agent 1850 may transmit the voice data obtained through a communication circuit (e.g., the communication circuit 690), to an intelligence server 1870.

According to an embodiment, in operation 1871, the intelligence server 1870 may convert the received voice data to text data and may determine a sequence of tasks including sequence information about tasks for performing the function of at least one application 1810, which is installed in a memory of an electronic device, based on the converted text data. Furthermore, in operation 1872, the intelligence server 1870 may transmit the determined sequence of tasks to the intelligence agent 1850.

According to an embodiment, in operation 1853, the intelligence agent 1850 receiving the sequence of tasks from the intelligence server 1870 may transmit the sequence of tasks to the execution manager module 1830. The execution manager module 1830 receiving the sequence of tasks may transmit tasks to the corresponding application 1810 based on sequence information of the tasks included in the sequence of tasks. For example, as in operation 1831, the execution manager module 1830 may transmit a first task to the application 1810.

As in operation 1811, the application 1810 receiving the first task may perform the first task. In addition, if the execution of the first task is completed, as in operation 1812, the application 1810 may transmit the execution completion response of the first task to the execution manager module 1830.

The execution manager module 1830 receiving the execution completion response of the first task may determine whether another second task, which is associated with the first task, from among the tasks is present; in the case where the second task is present, as in operation 1832, the execution manager module 1830 may transmit the second task to the application 1810. In this case, in operation 1813, the application 1810 may perform the received second task.

According to an embodiment, in the case where the second task is delayed (e.g., in the case where the execution is not completed within a specified time) or in the case where it is expected that the second task will be delayed (e.g., in the case where it is determined that the average processing time of the second task exceeds the specified time), as in operation 1814, the application 1810 may request the execution manager module 1830 to extend the time-out time associated with the second task. In this case, in operation 1833, the execution manager module 1830 may extend the time-out time associated with the second task. For example, the execution manager module 1830 may set the time-out time associated with the second task to the extended time again and may reset a time count.

According to an embodiment, as in operation 1815, the application 1810 may request the intelligence agent 1850 to display the execution state of the second task. In this case, the intelligence agent 1850 may output the execution state information associated with the second task on the screen of a display (e.g., the display 630). According to an embodiment, before outputting the execution state information about the second task on the screen, as in operation 1854, the intelligence agent 1850 may minimize the UI of the intelligence app. For example, the intelligence agent 1850 may hide the UI of the intelligence app and may display the icon of the intelligence app in a specific area of the screen.

According to an embodiment, as in operation 1816, the application 1810 may obtain an input to select the icon of the intelligence app. For example, in a state where the execution state information about the second task is displayed, the application 1810 may obtain a user input to select the icon of the intelligence app. In this case, the application 1810 may interrupt the execution of the second task. Furthermore, as in operation 1817, the application 1810 may notify the execution manager module 1830 or the intelligence agent 1850 that the execution of the second task is interrupted.

According to an embodiment, if receiving the notification that the execution of the second task is interrupted, in operation 1855, the intelligence agent 1850 may interrupt or cancel the processing of the sequence of tasks including the second task.

Figure 19:
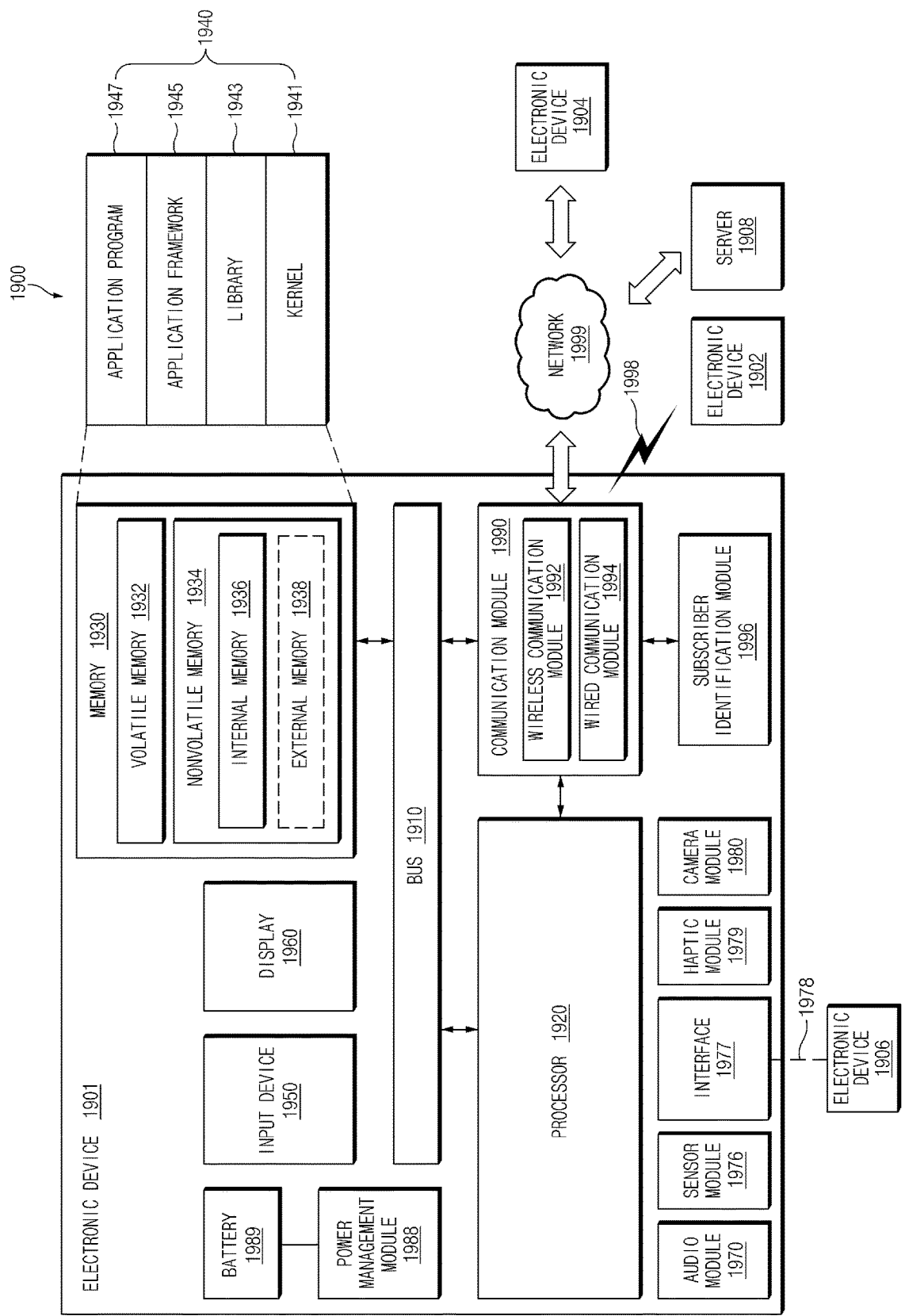
FIG. 19 illustrates an electronic device 1901 in a network environment 1900, according to various embodiments.

FIG. 19 illustrates an electronic device 1901 in a network environment 1900, according to various embodiments. According to various embodiments disclosed in the present disclosure, the electronic device 1901 may include various types of devices. For example, the electronic device 1901 may include at least one of a portable communication device (e.g., a smartphone), a computer device (e.g., a personal digital assistant (PDA), a tablet personal computers (PC), a laptop PC, a desktop PC, a workstation, or a server), a portable multimedia device (e.g., an e-book reader or an MP3 player), a portable medical device (e.g., a heart rate, blood glucose, blood pressure, or a thermometer), a camera, or a wearable device. A wearable device may include at least one of an accessory type of a device (e.g., a timepiece, a ring, a bracelet, an anklet, a necklace, glasses, a contact lens, or a head-mounted device (HMD)), one-piece fabric or clothes type of a device (e.g., electronic clothes), a body-attached type of a device (e.g., a skin pad or a tattoo), or a bio-implantable circuit. According to embodiments, the electronic device may include at least one of, for example, televisions (TVs), digital versatile disc (DVD) players, audio devices, audio accessory devices (e.g., a speaker, a headphone, or a headset), a refrigerator, an air conditioner, a cleaner, an oven, a microwave oven, a washing machine, an air cleaner, a set-top box, a home automation control panel, a security control panel, a game console, an electronic dictionary, an electronic key, a camcorder, or an electronic picture frame.

According to another embodiment, the electronic device may include at least one of a navigation device, a global navigation satellite system (GNSS), an event data recorder (EDR) (e.g., a black box for a car, a ship, or a plane), a vehicle infotainment device (e.g., a head-up display for a vehicle), an industrial or home robot, a drone, an automated teller machine (ATM), a point of sales (POS) device, a measurement device (e.g., a water meter, an electricity meter, or a gas meter), or Internet of things (e.g., a light bulb, a sprinkler device, a fire alarm, a thermostat, or a street lamp). According to an embodiment of the disclosure, the electronic device is not limited to the above-described devices. For example, similarly to a smartphone having function of measuring personal bio-information (e.g., a heart rate or blood glucose), the electronic device may provide functions of multiple devices in the complex manner. In the present disclosure, the term "user" used herein may refer to a person who uses the electronic device or may refer to a device (e.g., an artificial intelligence electronic device) that uses the electronic device.

Referring to FIG. 19, under the network environment 1900, the electronic device 1901 (e.g., the electronic device 600) may communicate with an electronic device 1902 through local wireless communication 1998 or may communication with an electronic device 1904 or a server 1908 through a network 1999. According to an embodiment, the electronic device 1901 may communicate with the electronic device 1904 through the server 1908.

According to an embodiment, the electronic device 1901 may include a bus 1910, a processor 1920 (e.g., the processor 650) a memory 1930 (e.g., the memory 670), an input device 1950 (e.g., a microphone 610 or a mouse), a display 1960 (e.g., the display 630), an audio module 1970, a sensor module 1976, an interface 1977, a haptic module 1979, a camera module 1980, a power management module 1988, a battery 1989, a communication module 1990 (e.g., the communication circuit 690), and a subscriber identification module 1996. According to an embodiment, the electronic device 1901 may not include at least one (e.g., the display 1960 or the camera module 1980) of the above-described elements or may further include other element(s).

For example, the bus 1910 may interconnect the above-described elements 1920 to 1990 and may include a circuit for conveying signals (e.g., a control message or data) between the above-described elements.

The processor 1920 may include one or more of a central processing unit (CPU), an application processor (AP), a graphic processing unit (GPU), an image signal processor (ISP) of a camera or a communication processor (CP). According to an embodiment, the processor 1920 may be implemented with a system on chip (SoC) or a system in package (SiP). For example, the processor 1920 may drive an operating system (OS) or an application to control at least one of another element (e.g., hardware or software element) connected to the processor 1920 and may process and compute various data. The processor 1920 may load a command or data, which is received from at least one of other elements (e.g., the communication module 1990), into a volatile memory 1932 to process the command or data and may store the process result data into a nonvolatile memory 1934. Further, the processor 1920 may include the intelligence agent 151, the intelligence service module 155, and execution manager module 153 as shown in FIG. 2.

The memory 1930 may include, for example, the volatile memory 1932 or the nonvolatile memory 1934. The volatile memory 1932 may include, for example, a random access memory (RAM) (e.g., a dynamic RAM (DRAM), a static RAM (SRAM), or a synchronous dynamic RAM (SDRAM)). The nonvolatile memory 1934 may include, for example, a one-time programmable read-only memory (OT-PROM), a programmable read-only memory (PROM), an erasable programmable read-only memory (EPROM), an electrically erasable programmable read-only memory (EE-PROM), a mask ROM, a flash ROM, a flash memory, a hard disk drive, or a solid-state drive (SSD). In addition, the nonvolatile memory 1934 may be configured in the form of an internal memory 1936 or the form of an external memory 1938 which is available through connection only if necessary, according to the connection with the electronic device 1901. The external memory 1938 may further include a flash drive such as compact flash (CF), secure digital (SD), micro secure digital (Micro-SD), mini secure digital (Mini-SD), extreme digital (xD), a multimedia card (MMC), or a memory stick. The external memory 1938 may be operatively or physically connected with the electronic device 1901 in a wired manner (e.g., a cable or a universal serial bus (USB)) or a wireless (e.g., Bluetooth) manner.

For example, the memory 1930 may store, for example, at least one different software element, such as an instruction or data associated with the program 1940, of the electronic device 1901. The program 1940 may include, for example, a kernel 1941, a library 1943, an application framework 1945 or an application program (interchangeably, "application") 1947. The memory 1930 may store a first app 141*a* associated with tasks 141*b*, and a second app 143*a* associated with tasks 143*b*.

The input device 1950 may include a microphone, a mouse, or a keyboard. According to an embodiment, the keyboard may include a keyboard physically connected or a keyboard virtually displayed through the display 1960. The microphone may be configured to receive a voice input.

The display 1960 may include a display, a hologram device or a projector, and a control circuit to control a relevant device. The screen may include, for example, a liquid crystal display (LCD), a light emitting diode (LED) display, an organic LED (OLED) display, a microelectromechanical systems (MEMS) display, or an electronic paper display. According to an embodiment, the display may be flexibly, transparently, or wearably implemented. The display may include a touch circuitry, which is able to detect a user's input such as a gesture input, a proximity input, or a hovering input or a pressure sensor (interchangeably, a force sensor) which is able to measure the intensity of the pressure by the touch. The touch circuit or the pressure sensor may be implemented integrally with the display or may be implemented with at least one sensor separately from the display. The hologram device may show a stereoscopic image in a space using interference of light. The projector may project light onto a screen to display an image. The screen may be located inside or outside the electronic device 1901. The display module may be configured to display objects such as the objects of FIGS. 9-17.

The audio module 1970 may convert, for example, from a sound into an electrical signal or from an electrical signal into the sound. According to an embodiment, the audio module 1970 may acquire sound through the input device 1950 (e.g., a microphone) or may output sound through an output device (not illustrated) (e.g., a speaker or a receiver) included in the electronic device 1901, an external electronic device (e.g., the electronic device 1902 (e.g., a wireless speaker or a wireless headphone)) or an electronic device 1906 (e.g., a wired speaker or a wired headphone) connected with the electronic device 1901

The sensor module 1976 may measure or detect, for example, an internal operating state (e.g., power or temperature) or an external environment state (e.g., an altitude, a humidity, or brightness) of the electronic device 1901 to generate an electrical signal or a data value corresponding to the information of the measured state or the detected state. The sensor module 1976 may include, for example, at least one of a gesture sensor, a gyro sensor, a barometric pressure sensor, a magnetic sensor, an acceleration sensor, a grip sensor, a proximity sensor, a color sensor (e.g., a red, green, blue (RGB) sensor), an infrared sensor, a biometric sensor (e.g., an iris sensor, a fingerprint sensor, a heartbeat rate monitoring (HRM) sensor, an e-nose sensor, an electromyography (EMG) sensor, an electroencephalogram (EEG) sensor, an electrocardiogram (ECG) sensor, a temperature sensor, a humidity sensor, an illuminance sensor, or an UV sensor. The sensor module 1976 may further include a control circuit for controlling at least one or more sensors included therein. According to an embodiment, the sensor module 1976 may be controlled by using the processor 1920 or a processor (e.g., a sensor hub) separate from the processor 1920. In the case that the separate processor (e.g., a sensor hub) is used, while the processor 1920 is in a sleep state, the separate processor may operate without awakening the processor 1920 to control at least a portion of the operation or the state of the sensor module 1976.

According to an embodiment, the interface 1977 may include a high definition multimedia interface (HDMI), a universal serial bus (USB), an optical interface, a recommended standard 232 (RS-232), a D-subminiature (D-sub), a mobile high-definition link (MHL) interface, a SD card/MMC interface, or an audio interface. A connector 1978 may physically connect the electronic device 1901 and the electronic device 1906. According to an embodiment, the connector 1978 may include, for example, an USB connector, an SD card/MMC connector, or an audio connector (e.g., a headphone connector).

The haptic module 1979 may convert an electrical signal into mechanical stimulation (e.g., vibration or motion) or into electrical stimulation. For example, the haptic module 1979 may apply tactile or kinesthetic stimulation to a user. The haptic module 1979 may include, for example, a motor, a piezoelectric element, or an electric stimulator.

The camera module 1980 may capture, for example, a still image and a moving picture. According to an embodiment, the camera module 1980 may include at least one lens (e.g., a wide-angle lens and a telephoto lens, or a front lens and a rear lens), an image sensor, an image signal processor, or a flash (e.g., a light emitting diode or a xenon lamp).

The power management module 1988, which is to manage the power of the electronic device 1901, may constitute at least a portion of a power management integrated circuit (PMIC).

The battery 1989 may include a primary cell, a secondary cell, or a fuel cell and may be recharged by an external power source to supply power at least one element of the electronic device 1901.

The communication module 1990 may establish a communication channel between the electronic device 1901 and an external device (e.g., the first external electronic device 1902, the second external electronic device 1904, or the server 1908). The communication module 1990 may support wired communication or wireless communication through the established communication channel. According to an embodiment, the communication module 1990 may include a wireless communication module 1992 or a wired communication module 1994. The communication module 1990 may communicate with the external device through a first network 1998 (e.g. a wireless local area network such as Bluetooth or infrared data association (IrDA)) or a second network 1999 (e.g., a wireless wide area network such as a cellular network) through a relevant module among the wireless communication module 1992 or the wired communication module 1994.

The wireless communication module 1992 may support, for example, cellular communication, local wireless communication, and global navigation satellite system (GNSS) communication. The cellular communication may include, for example, long-term evolution (LTE), LTE Advance (LTE-A), code division multiple access (CMA), wideband CDMA (WCDMA), universal mobile telecommunications system (UMTS), wireless broadband (WiBro), or global system for mobile communications (GSM). The local wireless communication may include wireless fidelity (Wi-Fi), Wi-Fi Direct, light fidelity (Li-Fi), Bluetooth, Bluetooth low energy (BLE), Zigbee, near field communication (NFC), magnetic secure transmission (MST), radio frequency (RF), or a body area network (BAN). The GNSS may include at least one of a global positioning system (GPS), a global navigation satellite system (Glonass), Beidou Navigation Satellite System (Beidou), the European global satellite-based navigation system (Galileo), or the like. In the present disclosure, "GPS" and "GNSS" may be interchangeably used.

According to an embodiment, when the wireless communication module 1992 supports cellular communication, the wireless communication module 1992 may, for example, identify or authenticate the electronic device 1901 within a communication network using the subscriber identification module (e.g., a SIM card) 1996. According to an embodiment, the wireless communication module 1992 may include a communication processor (CP) separate from the processor 2820 (e.g., an application processor (AP). In this case, the communication processor may perform at least a portion of functions associated with at least one of elements 1910 to 1996 of the electronic device 1901 in substitute for the processor 1920 when the processor 1920 is in an inactive (sleep) state, and together with the processor 1920 when the processor 1920 is in an active state. According to an embodiment, the wireless communication module 1992 may include a plurality of communication modules, each supporting only a relevant communication scheme among cellular communication, short-range wireless communication, or a GNSS communication scheme. The wireless communications module 1992 may transmit voice data to an intelligence server 200 and receive a sequence of tasks from the intelligence server 200.

The wired communication module 1994 may include, for example, include a local area network (LAN) service, a power line communication, or a plain old telephone service (POTS).

For example, the first network 1998 may employ, for example, Wi-Fi direct or Bluetooth for transmitting or receiving instructions or data through wireless direct connection between the electronic device 1901 and the first external electronic device 1902. The second network 1999 may include a telecommunication network (e.g., a computer network such as a LAN or a WAN, the Internet or a telephone network) for transmitting or receiving instructions or data between the electronic device 1901 and the second electronic device 1904. The first network 1998 can include the intelligence server 200.

According to embodiments, the instructions or the data may be transmitted or received between the electronic device 1901 and the second external electronic device 1904 through the server 1908 connected with the second network. Each of the external first and second external electronic devices 1902 and 1904 may be a device of which the type is different from or the same as that of the electronic device 1901. According to various embodiments, all or a part of operations that the electronic device 1901 will perform may be executed by another or a plurality of electronic devices (e.g., the electronic devices 1902 and 1904 or the server 1908). According to an embodiment, in the case that the electronic device 1901 executes any function or service automatically or in response to a request, the electronic device 1901 may not perform the function or the service internally, but may alternatively or additionally transmit requests for at least a part of a function associated with the electronic device 1901 to any other device (e.g., the electronic device 1902 or 1904 or the server 1908). The other electronic device (e.g., the electronic device 1902 or 1904 or the server 1908) may execute the requested function or additional function and may transmit the execution result to the electronic device 1901. The electronic device 1901 may provide the requested function or service using the received result or may additionally process the received result to provide the requested function or service. To this end, for example, cloud computing, distributed computing, or client-server computing may be used.

Various embodiments of the present disclosure and terms used herein are not intended to limit the technologies described in the present disclosure to specific embodiments, and it should be understood that the embodiments and the terms include modification, equivalent, and/or alternative on the corresponding embodiments described herein. With regard to description of drawings, similar elements may be marked by similar reference numerals. The terms of a singular form may include plural forms unless otherwise specified. In the disclosure disclosed herein, the expressions "A or B", "at least one of A and/or B", "at least one of A and/or B", "A, B, or C", or "at least one of A, B, and/or C", and the like used herein may include any and all combinations of one or more of the associated listed items. Expressions such as "first," or "second," and the like, may express their elements regardless of their priority or importance and may be used to distinguish one element from another element but is not limited to these components. When an (e.g., first) element is referred to as being "(operatively or communicatively) coupled with/to" or "connected to" another (e.g., second) element, it may be directly coupled with/to or connected to the other element or an intervening element (e.g., a third element) may be present.

According to the situation, the expression "adapted to or configured to" used herein may be interchangeably used as, for example, the expression "suitable for", "having the capacity to", "changed to", "made to", "capable of" or "designed to". The expression "a device configured to" may mean that the device is "capable of" operating together with another device or other components. For example, a "processor configured to (or set to) perform A, B, and C" may mean a dedicated processor (e.g., an embedded processor) for performing corresponding operations or a generic-purpose processor (e.g., a central processing unit (CPU) or an application processor) which performs corresponding operations by executing one or more software programs which are stored in a memory device (e.g., the memory 430).

The term "module" used in this specification may include a unit implemented with hardware, or hardware programmed with software stored therein. For example, the term "module" may be interchangeably used with the term "logic", "logic block", "component", "circuit", and the like. The "module" may be a minimum unit of an integrated component or a part thereof or may be a minimum unit for performing one or more functions or a part thereof. The "module" may be implemented mechanically or electronically and may include, for example, an application-specific IC (ASIC) chip, a field-programmable gate array (FPGA), and a programmable-logic device for performing some operations, which are known or will be developed.

According to various embodiments, at least a part of an apparatus (e.g., modules or functions thereof) or a method (e.g., operations) may be, for example, implemented by instructions stored in a computer-readable storage media (e.g., the memory 430) in the form of a program module. The instruction, when executed by a processor (e.g., a processor 420), may cause the processor to perform a function corresponding to the instruction. The computer-readable recording medium may include a hard disk, a floppy disk, a magnetic media (e.g., a magnetic tape), an optical media (e.g., a compact disc read only memory (CD-ROM) and a digital versatile disc (DVD), a magneto-optical media (e.g., a floptical disk)), an embedded memory, and the like. The one or more instructions may contain a code made by a compiler or a code executable by an interpreter.

Each element (e.g., a module or a program module) according to various embodiments may be composed of single entity or a plurality of entities, a part of the above-described sub-elements may be omitted or may further include other elements. Alternatively or additionally, after being integrated in one entity, some elements (e.g., a module or a program module) may identically or similarly perform the function executed by each corresponding element before integration. According to various embodiments, operations executed by modules, program modules, or other elements may be executed by a successive method, a parallel method, a repeated method, or a heuristic method, or at least one part of operations may be executed in different sequences or omitted. Alternatively, other operations may be added.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An electronic device comprising:
a display;
a microphone configured to receive a voice input;
a communication circuit configured to communicate with an external electronic device;
a memory configured to store at least one application; and
one or more processor(s) electrically connected to the microphone, the communication circuit, the display, and the memory,
wherein the one or more processor(s) is configured to:
obtain voice data corresponding to the voice input received through the microphone;
transmit the voice data to the external electronic device through the communication circuit;
receive a sequence for performing a first function of the at least one application, which is determined based on the voice data, from the external electronic device through the communication circuit;
while performing tasks based on the sequence, when it is determined that execution of a first task in the sequence is not completed within a specified time, extend a time-out time of the first task and switch the execution of the first task to be in background and not to be occupying a user interface; and
when it is determined that a second task in the sequence is executable independent of an execution result of the first task and requires a user input for a parameter currently absent in the memory and a memory of the external electronic device, perform the second task before completion of the first task and provide the user interface to obtain the user input.

2. The electronic device of claim 1, wherein the one or more processor(s) is further configured to:
when the execution of the first task is switched to the execution in background, output an object for providing a notification of presence of the first task to the display.

3. The electronic device of claim 2, wherein the one or more processor(s) is further configured to:
when a touch input to select the object occurs, output state information about the first task to the display.

4. The electronic device of claim 1, wherein the one or more processor(s) is further configured to:
when it is determined that the second task, which is executable, from among the tasks is absent, output a screen including an object which allows a second function of the at least one application to be performed, to the display.

5. The electronic device of claim 1, wherein the one or more processor(s) is further configured to:
output an object suggesting execution of a second function similar to the first function, to the display.

6. The electronic device of claim 1, wherein the one or more processor(s) is further configured to:
when the execution of the first task is not completed within the extended time-out time, extend the extended time-out time again.

7. The electronic device of claim 1, wherein the processor is further configured to:
when the execution of the first task is completed within the extended time-out time, determine whether a third task, which is associated with the first task, from among the tasks is present; and
when the third task is present, perform the third task.

8. A voice data processing method of an electronic device, the method comprising:
obtaining voice data corresponding to voice input received through a microphone;
transmitting the voice data to an external electronic device through a communication circuit;
receiving via the communication circuit, a sequence of tasks for performing a first function of at least one application, determined based on the voice data, from the external electronic device;
while performing the tasks based on the sequence of tasks, when it is determined that execution of a first task is not completed within a specified time, extending a time-out time of the first task and switching the execution of the first task to be in background and not to be occupying a user interface; and
when it is determined that a second task in the sequence is executable independent of an execution result of the first task and requires a user input for a parameter currently absent in a memory of the electronic device and a memory of the external electronic device, performing the second task before completion of the first task and providing the user interface to obtain the user input.

9. The method of claim 8, further comprising:
when the execution of the first task is switched to the execution in background, outputting an object for providing a notification of presence of the first task to a display.

10. The method of claim 9, further comprising:
when a touch input to select the object occurs, outputting state information about the first task to the display.

11. The method of claim 8, further comprising:
when it is determined that the second task, which is executable, from among the tasks is absent, outputting a screen including an object which allows a second function of the at least one application to be performed, to a display.

12. The method of claim 8, further comprising:
outputting an object suggesting the execution of a second function similar to the first function, to a display.

13. The method of claim 8, further comprising:
when the execution of the first task is not completed within the extended time-out time, extending the extended time-out time again.

14. The method of claim 8, further comprising:
when the execution of the first task is completed within the extended time-out time, determining whether a third task, which is associated with the first task, from among the tasks is present; and
when the third task is present, performing the third task.

15. An electronic device comprising:
a housing;
a touch screen display disposed inside the housing and exposed through a first portion of the housing;
a microphone disposed inside the housing and exposed through a second portion of the housing;
at least one speaker disposed inside the housing and exposed through a third portion of the housing;
a wireless communication circuit disposed inside the housing;
one or more processor(s) disposed inside the housing and electrically connected to the touch screen display, the microphone, the speaker, and the wireless communication circuit; and
a memory disposed inside the housing and electrically connected to the processor,
wherein the memory stores a first application including a first user interface, and
wherein the memory stores instructions that, when executed, cause the processor to:
receive a user input including a request for performing a task by using the first application, through at least one of the touch screen display or the microphone;
transmit data associated with the user input to an external server through the wireless communication circuit;
receive a response including information about sequence of states of the electronic device for performing the task, from the external server via the wireless communication circuit, wherein the electronic device is in the sequence of states to perform the task such that each of the states is completed within a specified time;
when one selected state associated with the first application lasts longer than the specified time, extend the specified time for the selected state; and
when it is determined that a second state in the sequence of states other than the selected state is executable independent of an execution result of the selected state and requires another user input for a parameter currently absent in the memory and a memory of the external server, perform operations associated with the second state before termination of the selected state and provide a second user interface to obtain the other user input.

16. The electronic device of claim 15, wherein the memory stores instructions, when executed, causing the processor to:
when receiving the user input, display a third user interface; and
when the specified time for the selected state is extended, display at least part of the first user interface.

17. An electronic device comprising:
a display;
a microphone configured to receive a voice input;
a memory configured to store at least one application; and
one or more processor(s) electrically connected to the microphone, the display, and the memory,
wherein the one or more processor(s) is configured to:
perform tasks based on a sequence,
while performing the tasks based on the sequence, when it is determined that execution of a first task in the sequence is not completed within a specified time, extend a time-out time of the first task and switch the execution of the first task to be in background and not to be occupying a user interface, and when it is determined that a second task in the sequence is executable independent of an execution result of the first task and requires a user input for a parameter currently absent in the memory and a memory of an external electronic device, perform the second task before completion of the first task and provide the user interface to obtain the user input.

* * * * *